(12) United States Patent
Newman et al.

(10) Patent No.: US 12,476,746 B2
(45) Date of Patent: *Nov. 18, 2025

(54) ENHANCED RELIABILITY BY WAVEFORM ANALYSIS IN 5G/6G COMMUNICATIONS

(71) Applicants: David E. Newman, Poway, CA (US); R. Kemp Massengill, Palos Verdes, CA (US)

(72) Inventors: David E. Newman, Poway, CA (US); R. Kemp Massengill, Palos Verdes, CA (US)

( * ) Notice: Subject to any disclaimer, the term of this patent is extended or adjusted under 35 U.S.C. 154(b) by 210 days.

This patent is subject to a terminal disclaimer.

(21) Appl. No.: 18/499,998

(22) Filed: Nov. 1, 2023

(65) Prior Publication Data

US 2024/0080144 A1 Mar. 7, 2024

Related U.S. Application Data

(63) Continuation of application No. 18/224,280, filed on Jul. 20, 2023, now Pat. No. 11,843,468, which is a continuation of application No. 18/305,307, filed on Apr. 21, 2023, now Pat. No. 11,824,667.

(60) Provisional application No. 63/496,769, filed on Apr. 18, 2023, provisional application No. 63/448,422, filed on Feb. 27, 2023, provisional application No. 63/447,167, filed on Feb. 21, 2023, provisional application No. 63/418,784, filed on Oct. 24, 2022, (Continued)

(51) Int. Cl.
*H04L 1/20* (2006.01)

(52) U.S. Cl.
CPC ............ *H04L 1/206* (2013.01); *H04L 1/201* (2013.01)

(58) Field of Classification Search
CPC ..... H04L 1/0045; H04L 1/0061; H04L 1/201; H04L 1/206; H04L 27/3809
See application file for complete search history.

(56) References Cited

U.S. PATENT DOCUMENTS

| | | | | |
|---|---|---|---|---|
| 5,546,411 A | * | 8/1996 | Leitch | H04L 1/1671 340/10.2 |
| 6,940,843 B2 | * | 9/2005 | Goodall | H04L 1/0002 370/332 |

(Continued)

FOREIGN PATENT DOCUMENTS

| | | | | |
|---|---|---|---|---|
| CN | 105917624 A | * | 8/2016 | ......... H04L 27/3872 |
| WO | 2011128314 | | 10/2011 | |
| WO | WO-2011128314 A1 | * | 10/2011 | ............. H04B 7/063 |

*Primary Examiner* — Wutchung Chu

(57) ABSTRACT

Corrupted messages in 5G and 6G are usually discarded, leading to a retransmission with its added costs, delays, and background generation. Therefore, disclosed herein are methods for a wireless receiver to determine which message elements are faulted, and in many cases to correct them, based on parameters of the waveform signal in each message element. Multiple parameters may be combined for better sensitivity to the fault condition. For example, the indicator parameters may be the modulation deviation of each message element, its amplitude or phase noise level, characteristic interference patterns between symbol-times, a polarization anomaly, a frequency offset, or combinations of these. After localizing the likely faulted message elements, the receiver may be able to recover the message by correcting the waveform signal or the demodulation value, thereby saving time and energy at near zero cost.

18 Claims, 17 Drawing Sheets

Related U.S. Application Data provisional application No. 63/403,924, filed on Sep. 6, 2022.

(56) References Cited

U.S. PATENT DOCUMENTS

| | | | |
|---|---|---|---|
| 9,825,672 B2* | 11/2017 | Lee | H02J 50/90 |
| 11,153,780 B1* | 10/2021 | Newman | H04B 17/373 |
| 11,387,865 B2* | 7/2022 | You | H04B 3/48 |
| 2003/0207696 A1* | 11/2003 | Willenegger | H04L 1/0002 |
| | | | 370/347 |
| 2005/0264827 A1* | 12/2005 | Schriever | G02B 5/0221 |
| | | | 356/509 |
| 2006/0083324 A1* | 4/2006 | DesJardins | H04L 1/0057 |
| | | | 375/260 |
| 2007/0089036 A1 | 4/2007 | Jiang | |
| 2007/0089037 A1 | 4/2007 | Jiang | |
| 2008/0025511 A1* | 1/2008 | Fuse | H04L 25/4917 |
| | | | 380/46 |
| 2008/0123788 A1 | 5/2008 | Wongwirawat | |
| 2008/0181294 A1* | 7/2008 | Andrle | H03J 5/242 |
| | | | 375/239 |
| 2009/0046771 A1 | 2/2009 | Abe | |
| 2009/0252010 A1* | 10/2009 | Bakx | G11B 7/0053 |
| | | | 369/53.17 |
| 2012/0014274 A1* | 1/2012 | Muraoka | H04W 52/241 |
| | | | 375/279 |
| 2012/0020240 A1* | 1/2012 | Miura | H04W 24/08 |
| | | | 370/252 |
| 2012/0278043 A1* | 11/2012 | Lewis | G01H 9/004 |
| | | | 702/189 |
| 2012/0311409 A1 | 12/2012 | Pedersen | |
| 2013/0022145 A1* | 1/2013 | Tabet | H04L 1/0009 |
| | | | 375/267 |
| 2013/0163656 A1 | 6/2013 | Sakamoto | |
| 2013/0346826 A1 | 12/2013 | Zopf | |
| 2014/0056342 A1 | 2/2014 | Baker | |
| 2014/0192847 A1* | 7/2014 | Afkhami | H04B 3/542 |
| | | | 375/340 |
| 2015/0171937 A1* | 6/2015 | Murakami | H04L 5/0032 |
| | | | 375/267 |
| 2015/0181501 A1* | 6/2015 | Soga | H04L 27/0012 |
| | | | 370/252 |
| 2016/0323091 A1 | 11/2016 | Inoue | |
| 2017/0359120 A1 | 12/2017 | Jacobs | |
| 2018/0077023 A1* | 3/2018 | Zhang | H04L 41/5003 |
| 2018/0357530 A1 | 12/2018 | Beery | |
| 2018/0376338 A1* | 12/2018 | Ashrafi | H04L 41/0895 |
| 2019/0104030 A1* | 4/2019 | Giust | H04L 41/5054 |
| 2019/0319868 A1* | 10/2019 | Svennebring | H04W 24/08 |
| 2020/0008044 A1* | 1/2020 | Poornachandran | |
| | | | H04L 41/5019 |
| 2020/0125389 A1* | 4/2020 | Palermo | H04W 28/084 |
| 2020/0136978 A1* | 4/2020 | Li | H04L 67/141 |
| 2020/0169856 A1* | 5/2020 | Yang | H04L 67/1008 |
| 2020/0169880 A1* | 5/2020 | Wen | H04L 63/102 |
| 2020/0195495 A1* | 6/2020 | Parker | H04L 41/40 |
| 2020/0204942 A1* | 6/2020 | Young | H04W 4/02 |
| 2020/0275313 A1* | 8/2020 | He | H04L 47/822 |
| 2020/0302431 A1* | 9/2020 | Polehn | H04L 9/3213 |
| 2020/0374974 A1* | 11/2020 | Sun | H04L 41/20 |
| 2020/0389531 A1* | 12/2020 | Lee | H04L 67/52 |
| 2021/0028992 A1* | 1/2021 | Chang | H04L 67/51 |
| 2021/0051104 A1* | 2/2021 | He | G06N 20/00 |
| 2021/0084525 A1* | 3/2021 | Takano | H04W 4/06 |
| 2021/0126840 A1* | 4/2021 | Venkataramu | H04L 61/4511 |
| 2021/0144057 A1* | 5/2021 | Giust | H04L 41/0806 |
| 2021/0144517 A1* | 5/2021 | Guim Bernat | G06F 9/5072 |
| 2021/0194821 A1* | 6/2021 | Guim Bernat | G06F 9/5011 |
| 2021/0360714 A1* | 11/2021 | Zhang | H04L 41/5051 |
| 2021/0376978 A1* | 12/2021 | Paz | H04L 5/0048 |
| 2021/0377763 A1 | 12/2021 | Tian | |
| 2021/0383207 A1 | 12/2021 | Beery | |
| 2021/0383220 A1 | 12/2021 | Beery | |
| 2022/0123825 A1 | 4/2022 | Mehrabani | |
| 2022/0141064 A1 | 5/2022 | Horn | |
| 2022/0166565 A1 | 5/2022 | Maki | |
| 2022/0231785 A1 | 7/2022 | Beery | |
| 2023/0004027 A1* | 1/2023 | Kawakami | G02F 1/01 |

* cited by examiner

One Symbol-time

One Symbol-time

FIG. 17

1701 - Provide input values, related to fault probability, to an AI model:

-- Amplitude and phase fluctuations.
-- Amplitude and phase modulation deviations.
-- Received amplitude or power (average over the message element).
-- Noise and interference (from demodulation reference and blanks).
-- FEC or CRC or parity code if provided.
-- Demodulation reference(s) used for demodulation of this message.
-- Polarization of each message element.
-- Frequency offset of each message element.
-- Smoothness of transitions between symbols.
-- Historical record of similar messages.
-- Form and format for this type of message.
-- Other rules and limits governing content.

1702 - Operate the AI model.

1703 - Determine the AI model outputs:

-- Fault probability of each message element.

OPTIONAL:
-- Uncertainty of each prediction.
-- The corrected value of each faulted message element(s).

ENHANCED RELIABILITY BY WAVEFORM ANALYSIS IN 5G/6G COMMUNICATIONS

PRIORITY CLAIMS AND RELATED APPLICATIONS

This application is a continuation of U.S. patent application Ser. No. 18/224,280, entitled "Fault Detection, Localization, and Correction by 5G/6G Signal Quality", filed Jul. 20, 2023, which is a continuation of U.S. patent application Ser. No. 18/305,307, entitled "Waveform Indicators for Fault Localization in 5G and 6G Messages", filed Apr. 21, 2023, which claims the benefit of U.S. Provisional Patent Application Ser. No. 63/403,924, entitled "Phase-Noise Mitigation at High Frequencies in 5G and 6G", filed Sep. 6, 2022, and U.S. Provisional Patent Application Ser. No. 63/418,784, entitled "Demodulation for Phase-Noise Mitigation in 5G and 6G", filed Oct. 24, 2022, and U.S. Provisional Patent Application Ser. No. 63/447,167, entitled "Incremental Realtime Signal-Quality Feedback in 5G/6G", filed Feb. 21, 2023, and U.S. Provisional Patent Application Ser. No. 63/448,422, entitled "AI-Managed Channel Quality Feedback in 5G/6G", filed Feb. 27, 2023, and U.S. Provisional Patent Application Ser. No. 63/496,769, entitled "Waveform Indicators for Fault Localization in 5G and 6G Messages", filed Apr. 18, 2023, all of which are hereby incorporated by reference in their entireties.

FIELD OF THE INVENTION

The disclosure pertains to wireless messaging, and more particularly to methods for localizing and mitigating faults in messages.

BACKGROUND OF THE INVENTION

Message faults are a limiting factor on reliability, especially in high-density urban and industrial settings expected for next-generation networks. Error-correction codes may be embedded in the message, but they occupy large amounts of resource area, and often fail to localize the faulted message element(s). Often the receiving entity is forced to request a retransmission, at substantial cost in time, power, and resources. Therefore, there is a need for methods to localize each faulted message element, and to repair it when possible, without retransmissions or bulky error-correction codes.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a method for a wireless receiver to correct a corrupted message, the method comprising: receiving a message and determining that the message includes at least one faulted message element, wherein each message element comprises a single resource element of a resource grid, each message element comprising a waveform signal, the waveform signal modulated according to a modulation scheme comprising Nstate allowed modulation states; determining at least two waveform parameters of each message element; determining, according to the at least two waveform parameters, a signal quality of each message element; selecting a selected message element having a lowest signal quality; replacing the selected message element with a different modulation state of the Nstate modulation states; and determining whether the message, including the selected message element so replaced, is corrupted.

In another aspect, there is non-transitory computer-readable media in a wireless receiver, the non-transitory computer-readable media containing instruction that, when executed by a computing environment, cause a method to be performed, the method comprising: using a modulation scheme comprising amplitude modulation according to integer Namp predetermined amplitude levels and phase modulation according to integer Nphase predetermined phase levels; receiving a message comprising message elements, each message element comprising a single resource element of a resource grid comprising symbol-times in time and subcarriers in frequency, each message element comprising a waveform signal; determining that the message is corrupted; for each message element, measuring a waveform amplitude and a waveform phase comprising the waveform signal; for each message element, comparing the waveform amplitude to the Namp predetermined amplitude levels, and determining an amplitude deviation comprising a difference between the waveform amplitude and a closest predetermined amplitude level; for each message element, comparing the waveform phase to the Nphase predetermined phase levels, and determining a phase deviation comprising a difference between the waveform phase and a closest predetermined phase level; determining, according to the amplitude deviation and the phase deviation, a signal quality of each message element; and determining a particular message element having a lowest signal quality.

In another aspect, there is a processor comprising an artificial intelligence model and non-transitory computer-readable media containing instructions that, when executed by a computing environment, cause a method to be performed, the method comprising: providing, as input to the artificial intelligence model, a plurality of measured parameters associated with each message element of a message comprising message elements, wherein each message element comprises a waveform, and wherein the measured parameters comprise, for each message element, an amplitude of the waveform and a phase of the waveform; determining, as output from the artificial intelligence model, for each message element, a probability that the message element is faulted.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

FIG. 17 is a flowchart showing an exemplary embodiment of a procedure for determining the likelihood that a message element is faulted according to a waveform, according to some embodiments.

Like reference numerals refer to like elements throughout.

DETAILED DESCRIPTION

Figure 1A:
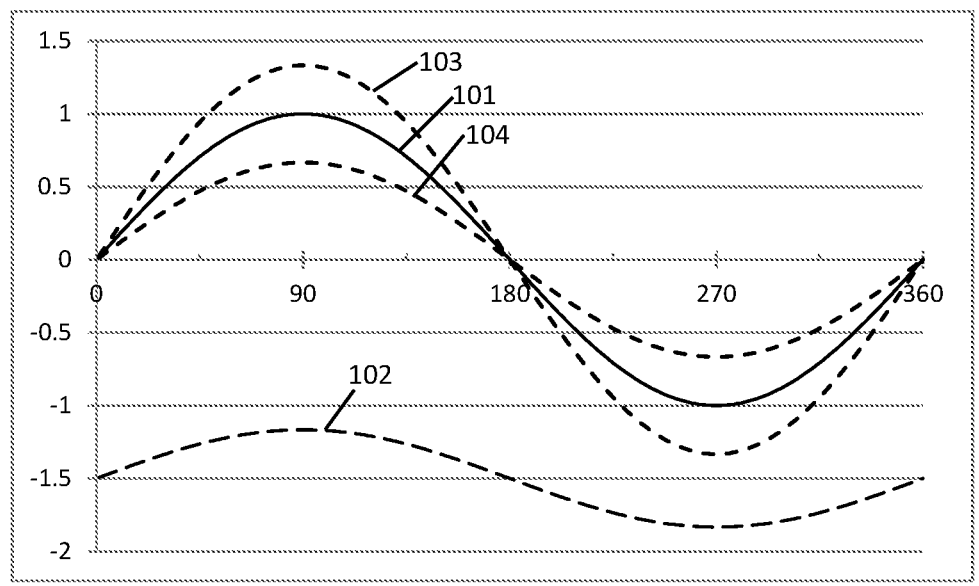
FIG. 1A is a schematic showing an exemplary embodiment of a signal waveform with and without interference, according to some embodiments.

Systems and methods disclosed herein (the "systems" and "methods", also occasionally termed "embodiments" or "arrangements" or "versions" or "examples", generally according to present principles) can provide urgently needed wireless communication protocols for identifying faulted message elements according to certain fault indicators in the received waveform of each message element. The waveform of a faulted signal is rich with information indicating the fault. An alert receiver can detect these fault indicators and thereby identify the faulted message element or elements, leading to a prompt mitigation. Fault indicators include fluctuations in amplitude or phase of the as-received waveform, the modulation deviation, polarization irregularities, a frequency offset relative to the subcarrier, and certain inter-symbol transition features, each of which can indicate intruding signals. Additional fault tests include the form and format of the message, its bitwise content, and its meaning. In combination, these fault indicators can identify the most likely faulted message element in many cases, thereby enabling a mitigation without the costs and delays of a retransmission.

The receiver can determine the distribution of fluctuations in amplitude or phase by digitizing the received waveform signal of each message element (or extracting it from a composite OFDM signal), determining an average amplitude or phase, and then determining the variations in amplitude or phase relative to the average, for each message element. The receiver can also determine the modulation deviation of each message element by measuring the difference between the modulation state of the received message element and the closest predetermined state of the modulation scheme. The receiver can also check the received polarization, the inter-symbol transition, and the frequency offset relative to the nominal subcarrier frequency, all of which contribute to the signal quality of each message element. The receiver can augment the waveform diagnostics by testing the form or format or content or meaning of the message versus the expected values, and thereby determine a suspicious message element. The receiver can then attempt a correction by either calculation (using an error-detection code) or by substitution (testing each state in the modulation scheme). An AI model may greatly enhance each of these procedures, as explained below. Embodiments may thereby enable the receiver to correct the fault rapidly, without a retransmission, and at very low cost.

The procedures disclosed below for fault localization may be adapted to the message features, such as the modulation scheme. If the message is modulated in QAM, involving two orthogonal amplitude-modulated signals, then the receiver can measure amplitude fluctuations in both I and Q branch amplitudes, either of which can reveal interference in the faulted message element. The receiver can also measure variations in phase (according to a ratio of the two branch amplitudes) which can also indicate the faulted message element. Alternatively, if the message is modulated in amplitude and phase of the raw waveform, the receiver can measure the amplitude distribution width and the phase distribution width for each message element to reveal the fault. If PSK modulation is used, involving just phase modulation, then the receiver can still determine fluctuations in both amplitude and phase, and thereby detect unexpected variations, since either parameter can be affected by interference. In addition, the receiver can measure the deviation or distance between the received modulation state of each message element and the closest predetermined modulation level. For example, the receiver can compare the amplitude as-received to a set of predetermined amplitude levels of the modulation scheme to determine an amplitude modulation deviation, and similarly for phase. Large modulation deviations indicate likely faulted message elements. Similar tests are described for polarization, edge transitions between symbols, and frequency offsets of each received waveform, each of which can indicate a fault. In many cases, the fault indications from each of these tests may be subtle, but when combined and correlated, the composite result reveal the faulted message element, in many cases.

Messages often include an error-detection code, such as a CRC or FEC or LDPC or other parity construct. The presence of a fault can be determined according to disagreement of the code with a message hash or digest. In that case, the waveform signal quality or suspiciousness may initially localize the fault, while the error-detection codes may be used to correct the faulted message element. The receiver can then determine whether the message fails to make sense in context, or violates proper format, or includes out-of-range data, or other reason based on the content of the message.

Artificial intelligence can assist in several stages of the fault detection, localization, and correction processes. For example, an AI model can enhance the evaluation of the waveform signal quality of each message element according to subtle and complex correlations between the amplitude and phase fluctuations, the modulation deviations, the polarization and transition irregularities, and the frequency offset, among other tests. AI can also assist in applying tests based on the message content, for example by correlating the message type, its form or format, and the meaning or intent of the message. After localizing the likely faulted message elements, AI can predict the correct values in many cases. In addition, the AI model can estimate the uncertainty in its prediction. A well-trained AI model can perform each of these tasks better than any human, faster than any human, and at insignificant cost after development, according to some embodiments.

Many applications of the disclosed procedures are foreseen in wireless communications, especially those with extremely tight latency and reliability requirements. A time-critical application such as remote surgery or ballistic missile control may benefit from the rapid recovery of faulted messages based on waveform analysis by the receiver, since retransmissions would likely be too late to be useful.

Embodiments of the procedures disclosed herein may be suitable for incorporation into a proprietary signal processing circuit, which may provide fast and automatic fault DL&C (detection, localization, and correction) upon receipt of each message, thereby successfully recovering each message fault before receiving the next symbol-time. Due to the increasing importance of communication reliability in next-generation networks, especially those with severe interference and propagation challenges, the real-time fault localization procedures disclosed herein may provide a key solution opportunity.

Glossary of Terms

Terms herein generally follow 3GPP (third generation partnership project) standards, but with clarification where needed to resolve ambiguities. As used herein, "5G" represents fifth-generation (including 5G Advanced), and "6G" represents sixth-generation, wireless technology. A network (or cell or LAN Local Area Network or RAN Radio Access Network or the like) may include a base station (or gNB or generation-node-B or eNB or evolution-node-B or AP Access Point) in signal communication with a plurality of user devices (or UE or User Equipment or user nodes or terminals or wireless transmit-receive units) and operationally connected to a core network (CN) which handles non-radio tasks, such as administration, and is usually connected to a larger network such as the Internet. The time-frequency space is generally configured as a "resource grid" including a number of "resource elements", each resource element being a specific unit of time termed a "symbol period" or "symbol-time", and a specific frequency and bandwidth termed a "subcarrier". Symbol periods may be termed "OFDM symbols" (Orthogonal Frequency-Division Multiplexing) in which the individual signals of multiple subcarriers are added in superposition. The time domain may be divided into ten-millisecond frames, one-millisecond subframes, and some number of slots, each slot including 14 symbol periods. The number of slots per subframe ranges from 1 to 8 depending on the "numerology" selected. The frequency axis is divided into "resource blocks" including 12 subcarriers, each subcarrier at a slightly different frequency. Subcarrier spacings of 15, 30, 60, 120, and 240 kHz are defined in various numerologies. Each subcarrier can be independently modulated to convey message information. Thus a resource element, spanning a single symbol period in time and a single subcarrier in frequency, is the smallest unit of a message. "QAM" or "quadrature" amplitude modulation (sometimes "PAM") refers to two amplitude-modulated signals with a 90-degree phase shift between them. The two signals may be called the "I" and "Q" branch signals (for In-phase and Quadrature-phase) or "real and imaginary" among others. Standard modulation schemes in 5G and 6G include BPSK (binary phase-shift keying), QPSK (quad phase-shift keying), 16QAM (quadrature amplitude modulation with 16 modulation states), 64QAM, 256QAM and higher orders.

"Classical" amplitude-phase modulation (sometimes "polar" modulation, "APSK" amplitude phase shift keying, "PQAM" polar quadrature amplitude modulation, and others) refers to message elements modulated in both amplitude and phase. Each of those terms applies to just a subset of general amplitude-phase modulation, and therefore are avoided herein. "SNR" (signal-to-noise ratio) and "SINR" (signal-to-interference-and-noise ratio) are used interchangeably unless specifically indicated. "RRC" (radio resource control) is a control-type message from a base station to a user device. "Digitization" refers to repeatedly measuring a waveform using, for example, a fast ADC (analog-to-digital converter) or the like. An "RF mixer" is a device for multiplying an incoming signal with a local oscillator signal, thereby selecting one component of the incoming signal. Communications generally proceed in scheduled "channels" such as the PUSCH and PUCCH (physical uplink shared and control channels) or the PDSCH and PDCCH (physical downlink shared and control channels) in addition to the PRACH (physical random access channel) and PBCH (physical broadcast channel). System information messages include the SSB (synchronization signal block) and SIB1 (system information block number 1) among others. A BSR (buffer status report) indicates a size of a planned uplink message. "SR" stands for scheduling request. "FEC" codes are forward error-correction codes provided with a message to attempt to correct errors. "CRC" are cyclic redundancy codes indicating whether a message is corrupted. "LDPC" codes are low-density parity codes also indicating fault conditions. "FFT" (fast Fourier transform) converts a waveform to a spectral distribution.

In addition to the 3GPP terms, the following terms are defined. Although in references a modulated resource element of a message may be referred to as a "symbol", this may be confused with the same term for a time interval ("symbol-time"), or a composite waveform or "OFDM symbol" (orthogonal frequency-division multiplexing), among other things. Therefore, each modulated resource element of a message is referred to as a "modulated message resource element", or more simply as a "message element", in examples below. A "demodulation reference" is one or more modulated "reference resource elements" or "reference elements" modulated according to the modulation scheme of the message and configured to exhibit levels of the modulation scheme (as opposed to conveying data). A "calibration set" is one or more predetermined amplitude levels and/or phase levels of a modulation scheme, typically determined by a demodulation reference. A "short-form" demodulation reference is a demodulation reference that exhibits only selected amplitude levels, such as the maximum and/or minimum amplitude levels, from which the receiver can determine any intermediate levels by calculation. A message may be transmitted "time-spanning" by occupying successive symbol-times on a single subcarrier, or "frequency-spanning" by occupying a single symbol-time on multiple subcarriers (not to be confused with time-division duplexing TDD and frequency-division duplexing FDD which pertain to duplexing of message pairs, and have nothing to do with the shape of each message in time-frequency space). "RF" or radio-frequency refers to electromagnetic waves in the MHz (megahertz) or GHz (gigahertz) frequency ranges. The "raw" signal is the as-received waveform before separation of the quadrature branch signals, and includes a raw-signal amplitude and a raw-signal phase. "Phase noise" is random noise or time jitter that alters the overall phase of a received signal, usually without significantly affecting the overall amplitude. "Phase-noise tolerance" is a measure of how much phase alteration can be imposed on a message element without causing a demodulation fault. "Amplitude noise" includes any noise or interference that primarily affects amplitudes of received signals. Interference due to competing signals is treated as noise herein, unless otherwise specified. A "faulted" message has at least one incorrectly demodulated message element. A "phase fault" is a message element demodulated as a state differing in phase from the intended modulation state, whereas an "amplitude fault" is a message element demodulated as a state differing in amplitude from the intended modulation state. The incoming signal to the receiver may be termed the "raw" waveform or signal, which includes a "raw amplitude" and a "raw phase". The receiver can then process the raw signal by separating it into two orthogonal branches, as mentioned. The receiver can also combine the branch amplitudes to determine a "sum-signal", which is the vector sum of the I and Q branch signals and generally approximates the raw waveform. A vector sum is a sum of two vectors, which in this case represent the amplitudes and phases of the two orthogonal branches in I-Q space. The sum-signal has a "sum-signal amplitude", equal to the square root of the sum of the I and Q branch amplitudes squared (the "root-sum-square" of I and Q), and a "sum-signal phase", equal to the arctangent of the ratio of the I and Q signal amplitudes (plus an optional base phase, ignored herein). Thus the sum-signal represents the raw received waveform of a particular subcarrier, aside from signal processing errors in the receiver—which are generally negligible and are ignored herein.

As used herein, a "modulation deviation" is a difference between a message element's received modulation state and the closest modulation state of the modulation scheme, or alternatively the difference between the received modulation amplitude or phase and the closest predetermined amplitude or phase level of the modulation scheme. A "fluctuation" is a measure of the temporal variations (relative to an average value) of the waveform signal within a single resource element, such as fluctuations in phase or amplitude within one symbol-time, due to noise or interference. The signal in each message element can be measured multiple times within each message element, and the distribution of amplitudes or phases in those measurements can represent a "width" of the fluctuation distribution and a "peak" location of the distribution, either of which can indicate which message element is faulted. To demodulate the message element, such fluctuations are generally averaged for the entire message element, and then the average value is compared to the predetermined amplitude or phase levels. The "modulation quality" is inversely related to the modulation deviation. The "signal quality" is a composite metric from the various waveform measurements, in which low signal quality indicates the likely faults. "Suspiciousness" represents an overall estimate of the likelihood that the message element is incorrectly demodulated, based on the waveform signal-quality analysis plus the message content analysis. In general, a faulted message element is expected to have a higher suspiciousness and lower signal quality than the non-faulted message elements, thereby enabling the receiver to identify the faulted message elements for mitigation.

How Interference Affects Waveform

Turning now to the figures, the following examples show how various waveform fluctuations can occur due to interference.

FIG. 1A is a schematic showing an exemplary embodiment of a signal waveform with and without interference, according to some embodiments. As depicted in this non-limiting example, a waveform received by a wireless receiver is depicted as a sine wave 101 with zero noise and interference. Also shown is a typical interference 102 which in this case has the same phase as the signal waveform 101 but a smaller amplitude. The noise or interference 102 generally adds or subtracts from the signal waveform 101, depending on factors such as antenna orientation, phase, and timing. For example, if the interference 102 is received "constructively", it adds to the signal waveform 101, resulting in an increase in amplitude as 103. If the interference 102 is received "destructively", it is subtracted from the waveform 101, resulting in the lower amplitude as 104.

Receivers generally use a narrow-band digital filter to separate each subcarrier waveform, and the digital filter admits only a narrow range of wavelengths. Digital filtering, among other signal processing, may be used to extract one subcarrier signal from an OFDM symbol that includes a large number of subcarrier signals superposed. The digital filter also selects noise or interference in the narrow subcarrier bandwidth. (Some receivers, may analyze the complex OFDM waveform to measure the amplitudes of the subcarrier components without explicitly separating the waveform.) The bandwidth of the subcarrier (15 kHz at the lowest numerology), suppresses features that represent frequencies significantly outside that bandwidth. Nevertheless, many signal irregularities can pass the filter and thereby reveal the faulted message element.

Figure 1B:
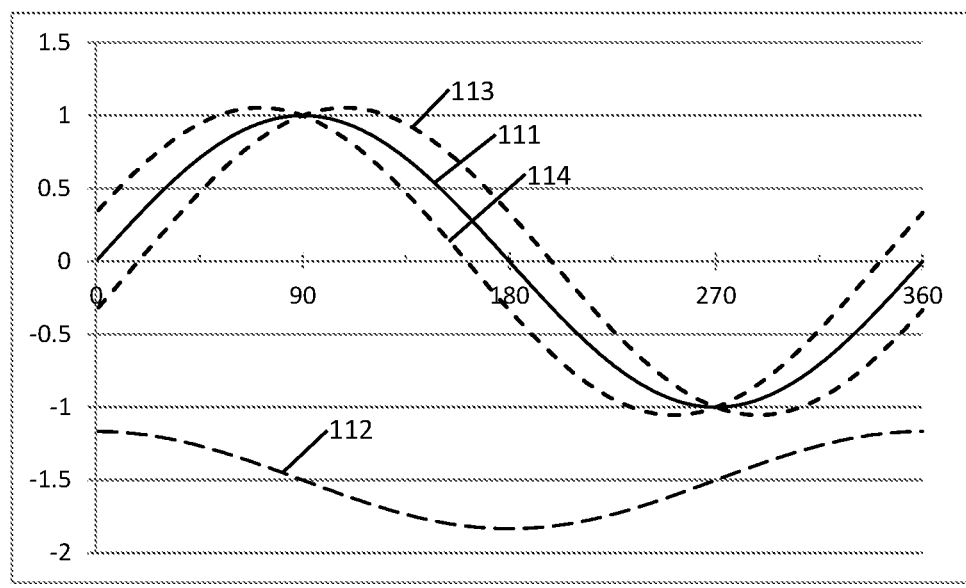
FIG. 1B is a schematic showing another exemplary embodiment of a signal waveform with and without interference, according to some embodiments.

FIG. 1B is a schematic showing another exemplary embodiment of a signal waveform with and without interference, according to some embodiments. As depicted in this non-limiting example, the noise-free signal waveform 111 is shown as in the previous figure, and now the noise or interference 112 has a 90 degree phase shift relative to the signal waveform 111. When added to the signal waveform 111, the noise 112 causes a phase shift as shown at 114. When the noise 112 is subtracted from the signal waveform 111, the combined waveform 113 has a phase advance as shown.

A receiver may incorrectly demodulate a message element that has an amplitude or phase change due to interference of the types depicted, thereby causing a fault. Accordingly, the receiver can localize the faulted message element according to an unexpected amplitude or phase of the waveform.

In an OFDM symbol, each subcarrier signal is transmitted orthogonal to its neighboring subcarrier signals. Orthogonality, in this sense, means that the net overlap between two adjacent subcarrier waveforms is theoretically zero. Signal orthogonality greatly suppresses inter-subcarrier crosstalk, but only for the transmitted signal. Orthogonality does not apply to noise and interference because the noise and interference can have arbitrary phase and frequency. The narrow-band filtering limits the range of distortions that can appear in each message element. For many types of noise and interference, valuable waveform information remains in the filtered waveform and can be used to identify faults. Hence one purpose of the disclosed procedures is to enable the receiver to measure the effects of waveform distortion, identify those message elements that have been faulted, and to correct them in real-time.

Figure 2A:
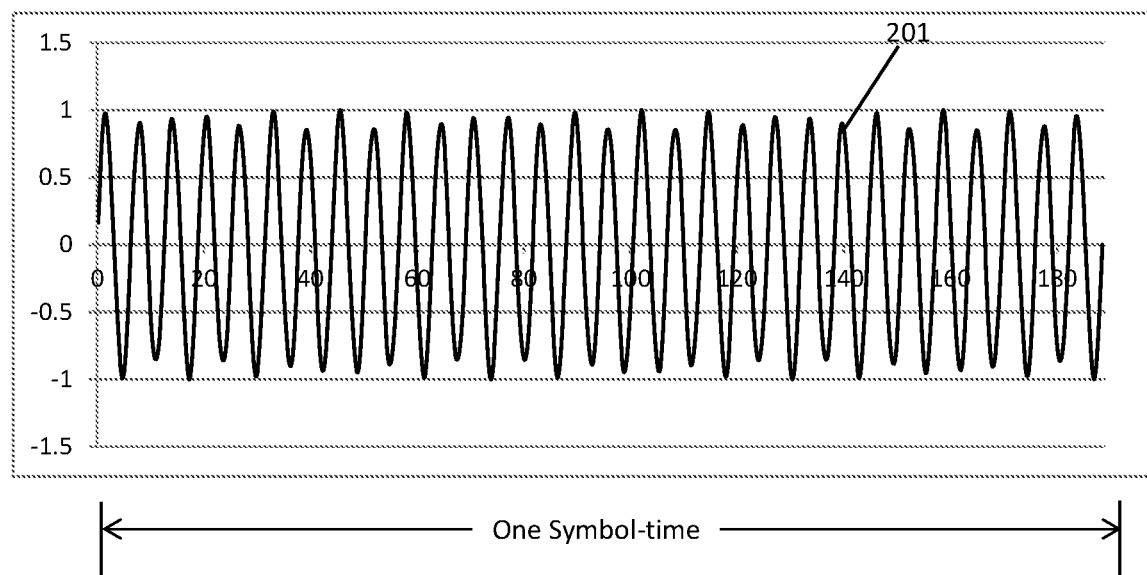
FIG. 2A is a schematic showing an exemplary embodiment of a signal waveform with minimal interference, according to some embodiments.

FIG. 2A is a schematic showing an exemplary embodiment of a signal waveform with a small amount of noise, according to some embodiments. As depicted in this non-limiting example, the waveform signal 201 of a single message element is shown schematically as a sine wave filling a symbol-time (not to scale). Some noise is superposed; hence the waveform 201 appears somewhat fluctuating in amplitude, as shown. The receiver can measure the amplitude fluctuations and determine a distribution of amplitudes, or equivalently, of the amplitude fluctuations relative to a mean. The receiver can then determine an average size of the amplitude fluctuations, corresponding to a width of the fluctuation distribution. A message element with the largest fluctuations is likely faulted.

Figure 2B:
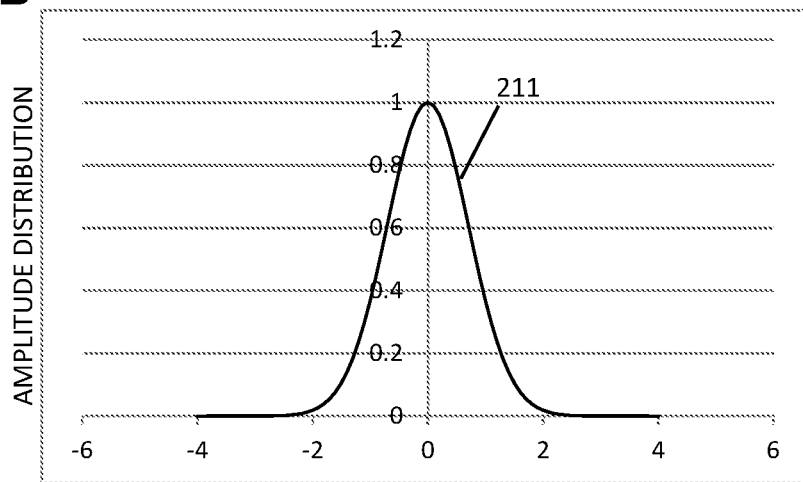
FIG. 2B is a schematic showing an exemplary embodiment of a fluctuation distribution of a waveform amplitude with minimal interference, according to some embodiments.

FIG. 2B is a schematic showing an exemplary embodiment of a fluctuation distribution of a waveform amplitude including minimal random noise, according to some embodiments. As depicted in this non-limiting example, the distribution of waveform amplitudes is plotted as 211. The distribution is zero-centered because the average amplitude has been subtracted. In the depicted case, the amplitude distribution 211 is a "normal" or "Gaussian" distribution characteristic of thermal noise, such as amplifier noise in the receiver. The horizontal axis is demarked in standard deviations of the Gaussian. In practice, however, the distribution is often not Gaussian, due to interference, and therefore a more convenient measure of distortion is the FWHM full-width at half-maximum of the distribution 211. Another valuable diagnostic is the peak position (or skew) of the amplitude distribution. The peak is centered in the depicted case, can be displaced by asymmetrical distortions, as discussed below. Since noise and interference tend to increase the width and/or skew, the receiver can identify the most likely faulted message element, according to some embodiments.

Figure 3A:
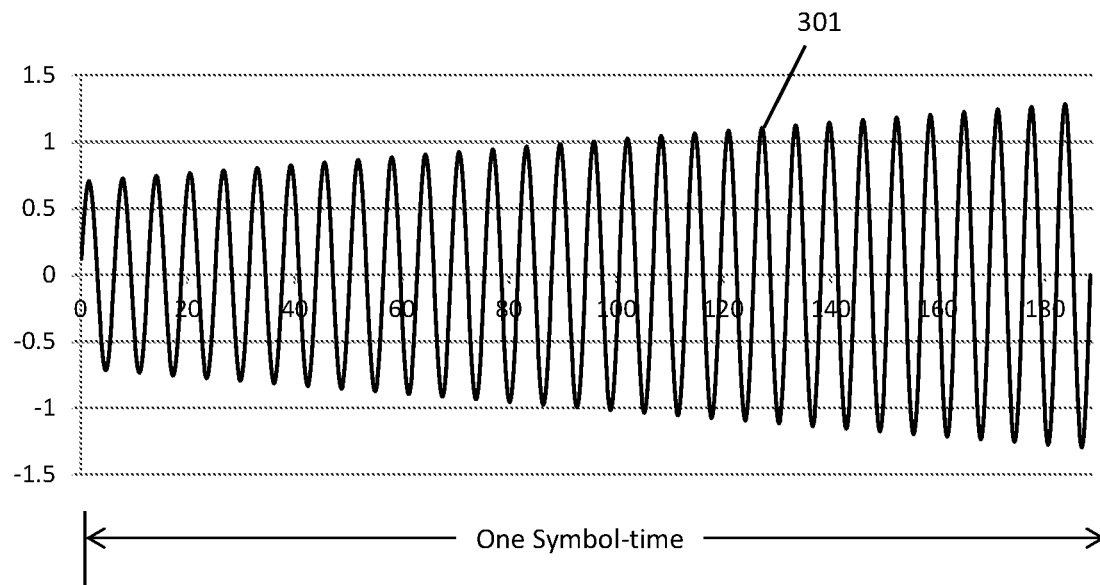
FIG. 3A is a schematic showing an exemplary embodiment of a signal waveform with rising interference, according to some embodiments.

FIG. 3A is a schematic showing an exemplary embodiment of a signal waveform with temporally rising interference, according to some embodiments. As depicted in this non-limiting example, a waveform 301 of a single message element is increasing in amplitude during the symbol-time, due to some kind of changing noise or interference. The receiver can measure the amount of amplitude fluctuation, and can determine that significant interference is present.

Figure 3B:
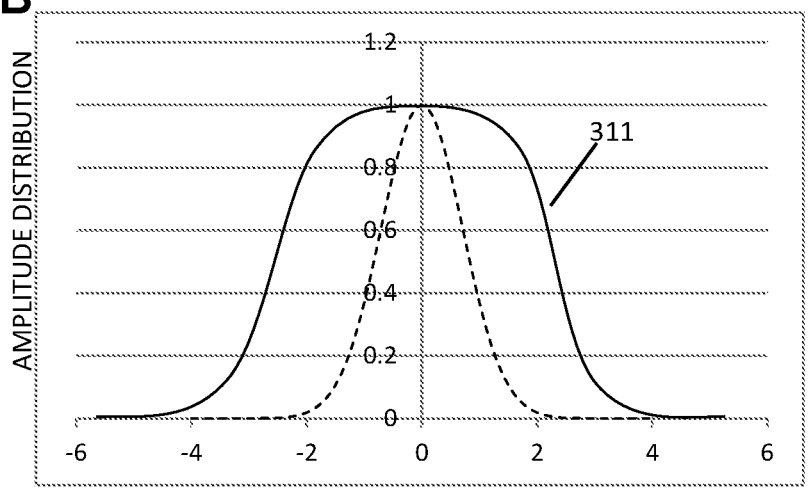
FIG. 3B is a schematic showing an exemplary embodiment of a fluctuation distribution of a waveform amplitude with rising interference, according to some embodiments.

FIG. 3B is a schematic showing an exemplary embodiment of a fluctuation distribution of a waveform amplitude with rising or falling interference, according to some embodiments. As depicted in this non-limiting example, the distribution of amplitude values observed in the received waveform 301 is shown as the solid line 311. The original low-noise Gaussian is also shown in dash for comparison. As shown, the fluctuation distribution 311 is widened due to the substantial variation in amplitude during the symbol-time.

Here and below, distortions are shown exaggerated for clarity. Some of the exaggerated effects would be suppressed by the narrow-band digital filter, and some would appear in a different form in other subcarriers, but are included here for illustration purposes.

Figure 4A:
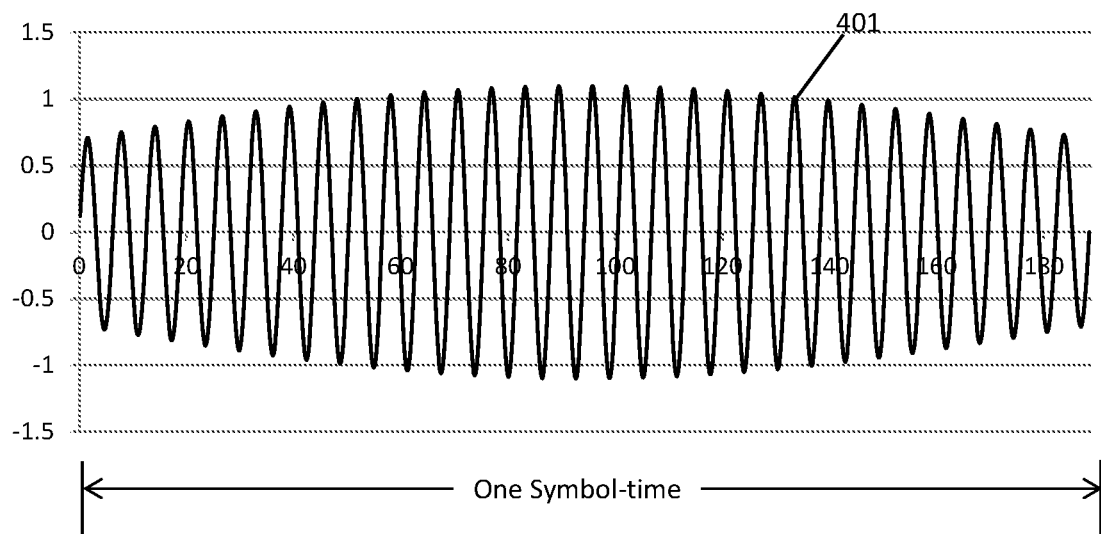
FIG. 4A is a schematic showing an exemplary embodiment of a signal waveform with peaking interference, according to some embodiments.

FIG. 4A is a schematic showing an exemplary embodiment of a signal waveform with peaking interference, according to some embodiments. As depicted in this non-limiting example, a signal waveform 401 increases and then decreases in amplitude during the symbol-time, due to time-dependent interference for example. The receiver can detect the interference according to the time-dependent amplitude, and can thereby identify suspicious message elements.

Figure 4B:
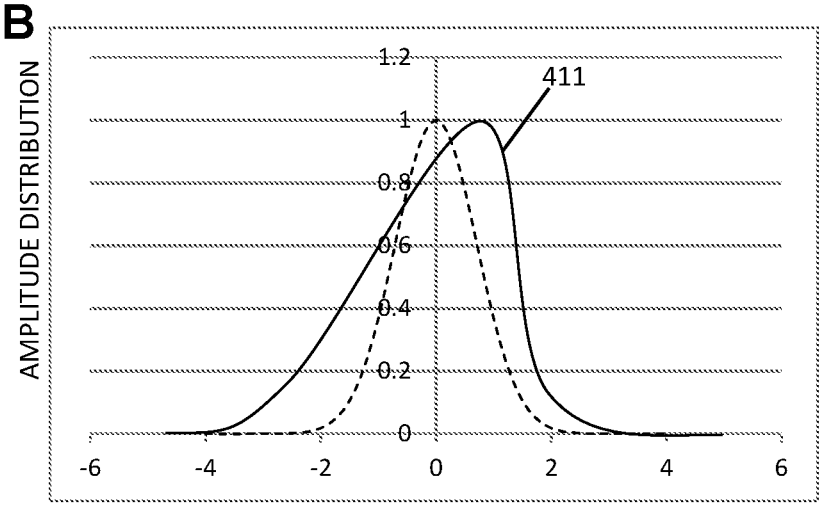
FIG. 4B is a schematic showing an exemplary embodiment of a fluctuation distribution of a waveform amplitude with peaking interference, according to some embodiments.

FIG. 4B is a schematic showing an exemplary embodiment of a fluctuation distribution of a waveform amplitude with peaking interference, according to some embodiments. As depicted in this non-limiting example, the amplitude distribution 411 for the waveform 401 is shown, skewed by the asymmetric variation of amplitudes during the amplitude changes. The receiver can measure the width and the peak position to determine that interference is present.

Figure 5A:
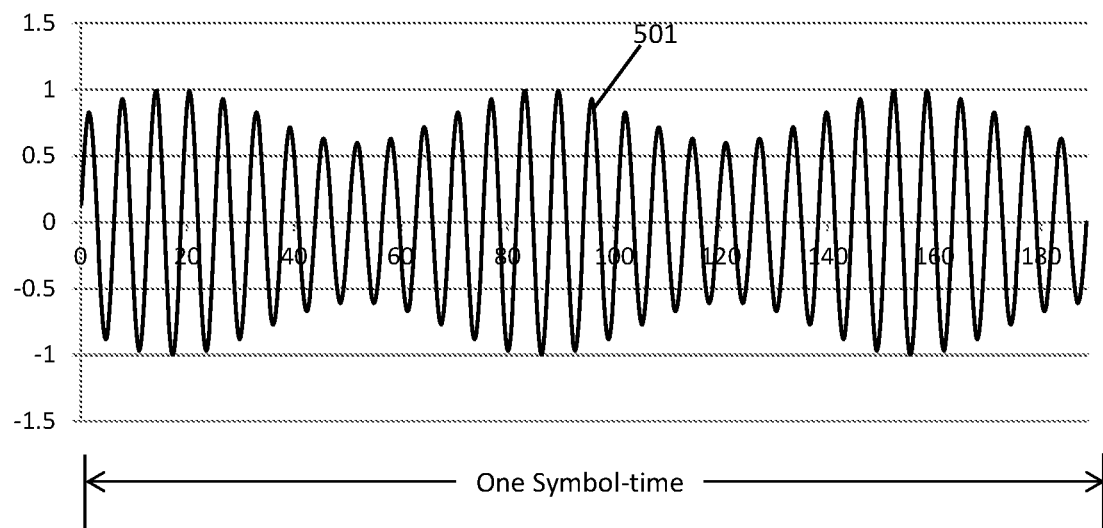
FIG. 5A is a schematic showing an exemplary embodiment of a signal waveform with frequency interference, according to some embodiments.

FIG. 5A is a schematic showing an exemplary embodiment of a signal wave with interference, according to some embodiments. As depicted in this non-limiting example, a waveform 501 is beset by strong interference at a slightly different frequency (but within the filter bandwidth), resulting in the interference pattern shown.

Figure 5B:
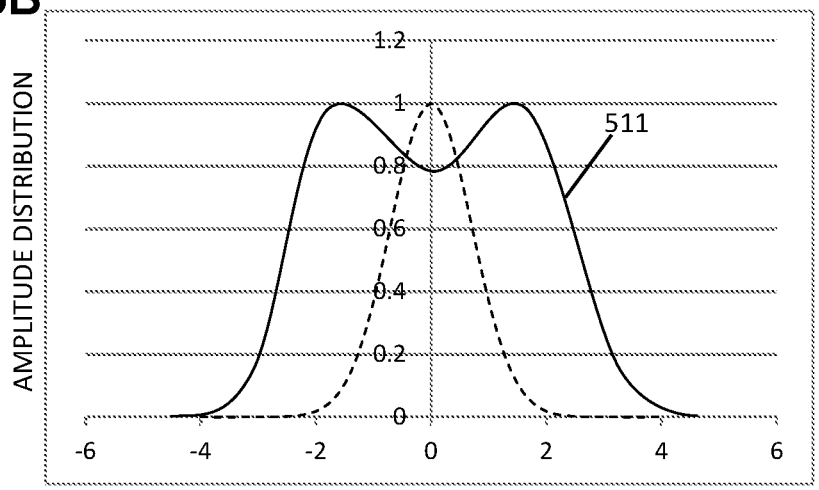
FIG. 5B is a schematic showing an exemplary embodiment of a fluctuation distribution of a waveform amplitude with frequency interference, according to some embodiments.

FIG. 5B is a schematic showing an exemplary embodiment of a fluctuation distribution of a waveform amplitude with frequency interference, according to some embodiments. As depicted in this non-limiting example, the amplitude distribution 511 is double-peaked due to the shape of the waveform, since most of the wavelengths are either larger or smaller than the average, while the intermediate sizes are under-represented. The receiver can detect the wider distribution function, and can thereby determine that severe interference is likely happening in the affected message element.

Depending on the amplitude, phase, and temporal fluctuation of the encroaching interference, a wide variety of other amplitude fluctuations and distribution functions are possible. The receiver may detect the distortion either by measuring the amplitude fluctuations directly, or by determining the width of the amplitude distribution within the message element's symbol-time, or by detecting the peak position of the distribution, or other parameters of the fluctuations and/or the distribution function.

The foregoing examples deal primarily with amplitude fluctuations. Phase fluctuations can also indicate interference, and can be processed in a similar way to reveal the faulted message element, as the next example shows.

Figure 6A:
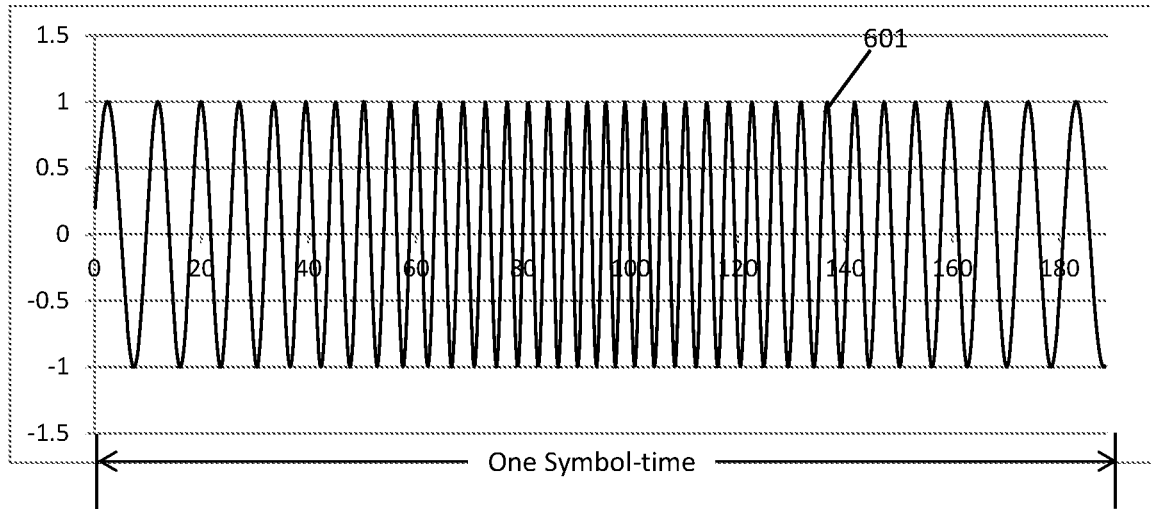
FIG. 6A is a schematic showing an exemplary embodiment of a signal waveform with phase noise, according to some embodiments.

FIG. 6A is a schematic showing an exemplary embodiment of a signal waveform with time-dependent phase noise, according to some embodiments. As depicted in this non-limiting example, a signal waveform 601 is a sine wave with a variable phase or frequency (greatly exaggerated). A phase or frequency fluctuation due to noise or interference (such as that shown in FIG. 1B for example) may be detected in various ways. The phase fluctuation can be measured according to a varying relative phase between a local oscillator and the signal waveform 601, or by digitizing and Fourier transforming the waveform to reveal a widened spectrum, or by measuring the zero-cross times of the waveform versus time in one symbol-time, among other possible ways.

Figure 6B:
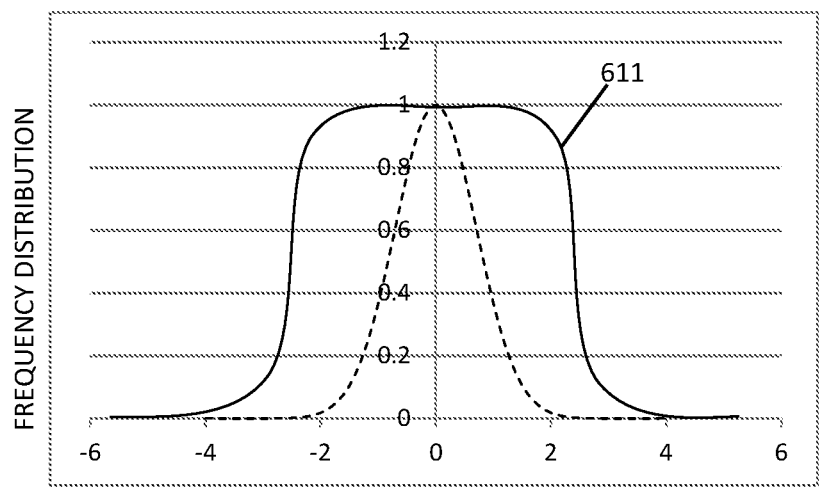
FIG. 6B is a schematic showing an exemplary embodiment of a fluctuation distribution of a waveform phase with interference, according to some embodiments.

FIG. 6B is a schematic showing an exemplary embodiment of a fluctuation distribution of a waveform phase with interference, according to some embodiments. As depicted in this non-limiting example, a distribution of phase fluctuations (or equivalently, frequency fluctuations) is shown 611 including the severe phase variations of the previous figure. For comparison, a low-noise distribution is also shown (dash) of phases of the waveform of a message element that has normal noise but no interference. The distribution 611 is shown truncated at both ends due to the narrow-band digital filter. In that case, some energy may appear in various forms in the adjacent subcarriers. The wide distribution 611 may indicate to a receiver that phase noise or frequency interference is present, thereby rendering the message element suspicious.

The receiver can also detect a faulted message element according to a frequency offset within the subcarrier, as shown in the following example.

Figure 6C:
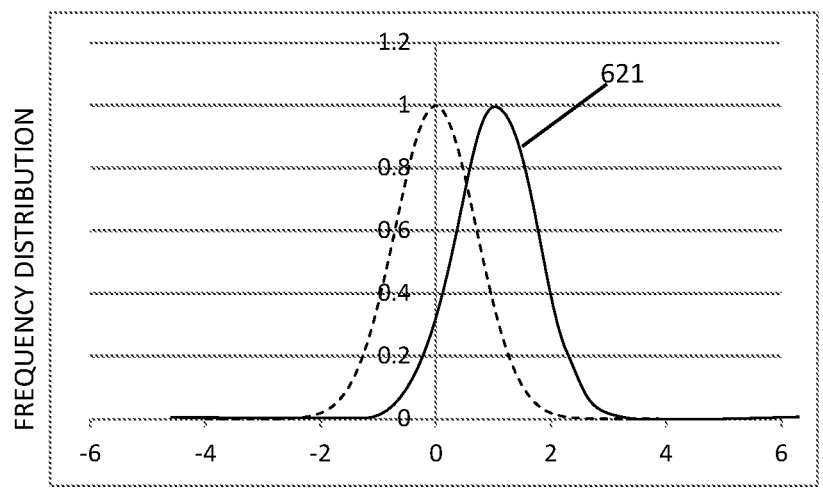
FIG. 6C is a schematic showing an exemplary embodiment of an FFT spectrum of a waveform with frequency interference, according to some embodiments.

FIG. 6C is a schematic showing an exemplary embodiment of an FFT spectrum of a waveform with frequency interference, according to some embodiments. As depicted in this non-limiting example, a frequency spectrum with a frequency offset 621 is shown along with an unshifted spectrum (dash). Both spectra have low noise in this case, as indicated by the width of the shifted peak 621 which is about the same width as the low-noise peak in dash. The receiver can measure the frequency offset by performing an FFT on the digitized waveform and comparing the peak center relative to the local oscillator of the receiver, and can thereby reveal the likely faulted message element. In some cases, the interference results in two spaced-apart frequency peaks, which would also indicate that the message element is suspicious. Other spectral effects are possible depending on interference, almost all of which would indicate that the affected message element is likely faulted.

Following is a different waveform diagnostic which relates to the transition region between two successive message elements. A receiver can detect a faulted message element when the waveform in a transition region between sequential symbol-times is distorted, as shown in the following examples.

Figure 7A:
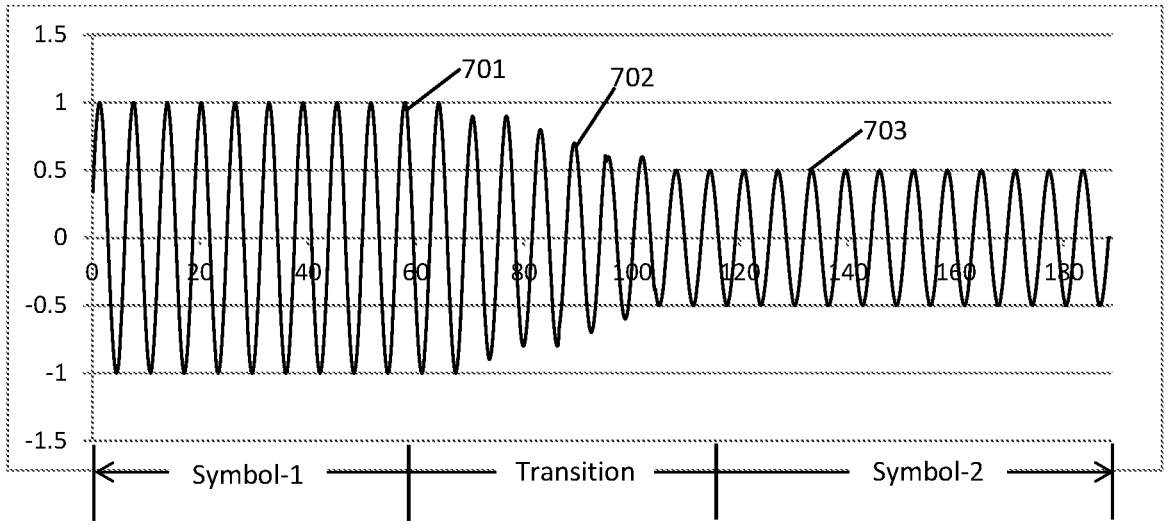
FIG. 7A is a schematic showing an exemplary embodiment of a transition between sequential symbols, according to some embodiments.

FIG. 7A is a schematic showing an exemplary embodiment of a waveform transition between sequential symbols, according to some embodiments. As depicted in this non-limiting example, a transition 702 is shown between the signals in two sequential symbol-times 701, 703 "symbol-1" and "symbol-2" on the same subcarrier. The two symbols probably belong to two different messages, because in modern networks the messages are usually configured frequency-spanning (occupying multiple subcarriers at a single symbol-time); hence the two temporally sequential symbol-times usually belong to different messages, unless one message is so long that it occupies two symbol-times. Nevertheless, certain features of the transition waveform can reveal a fault in one or both of the resource elements involved.

The two adjacent symbol-times usually have different modulations, such as different amplitudes or phases. Therefore the transmitted signal must transition from the first waveform 701 down to the second waveform 703 during the transition time 702 (as received, passing the narrow-band filter). As transmitted, the transition is generally smooth and featureless since the two symbols are at the same narrow subcarrier frequency. However, if there is external interference, the waveform is likely distorted during the interval while the two competing signals are varying, that is, during the transition time.

In this figure there is no such interference. The waveform is initially large at 701, representing the modulation of symbol-1, and then tapers into a smaller amplitude at 703, representing the modulation of symbol-2. The amplitude in the transition region 702 is featureless and monotonic, thereby indicating that interference either zero or negligible.

Figure 7B:
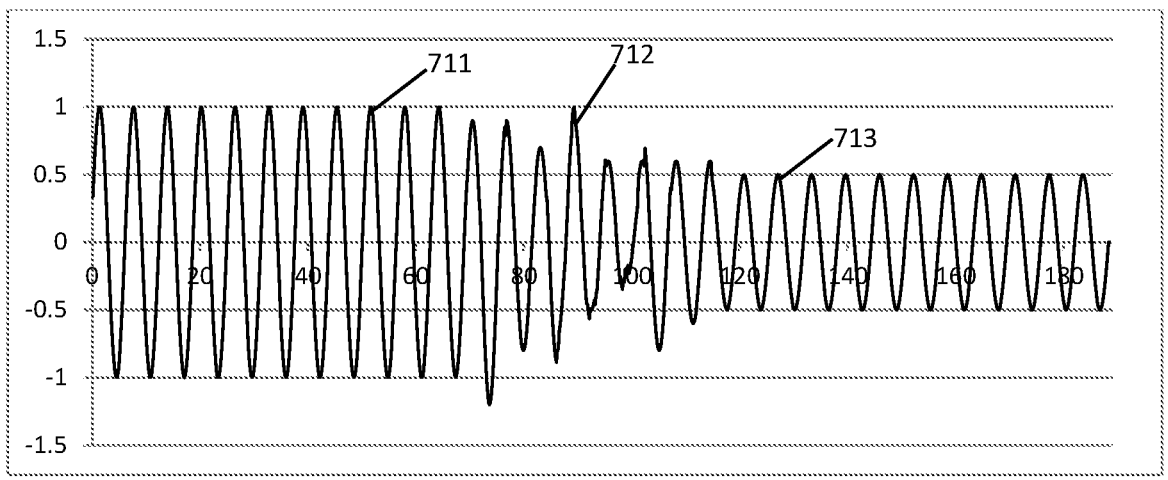
FIG. 7B is a schematic showing an exemplary embodiment of a transition between sequential symbols with interference, according to some embodiments.

FIG. 7B is a schematic showing an exemplary embodiment of a transition between temporally sequential symbols with interference, according to some embodiments. As depicted in this non-limiting example, a first symbol-time waveform 711 transitions to a second symbol-time waveform 713 on the same subcarrier, through a transition region 712. In this case, there is substantial interference which shows up primarily in the transition time 712 as an erratic fluctuation in the amplitude. There may also be a fluctuation in phase.

An irregular transition such as 712 may result from signals received from two transmitters in neighboring networks with a timing offset. The two transmitters may have displaced time-bases, or the time offset may can result from the different propagation times. Such interference may be difficult to detect during the stable waveform intervals since the interference is constant in those times. During the transition 712, however, the summed amplitude may vary erratically while the two signals are changing.

A receiver can detect the amplitude or phase fluctuations during the transition time 712, and can thereby determine that either symbol-1 or symbol-2 may be faulted. For example, the receiver can determine the maximum rate of change of the amplitude or the phase or other waveform parameter in the transition region. The smooth low-noise transition of the previous figure generally has a low rate of change (not counting the RF component) whereas the interfered version of the present figure exhibits chaotic variations with a high rate of change. The receiver can measure the fluctuation distribution at the leading transition before symbol-1 and the trailing transition after symbol-2. In some cases, both the leading and trailing transitions are affected.

Figure 7C:
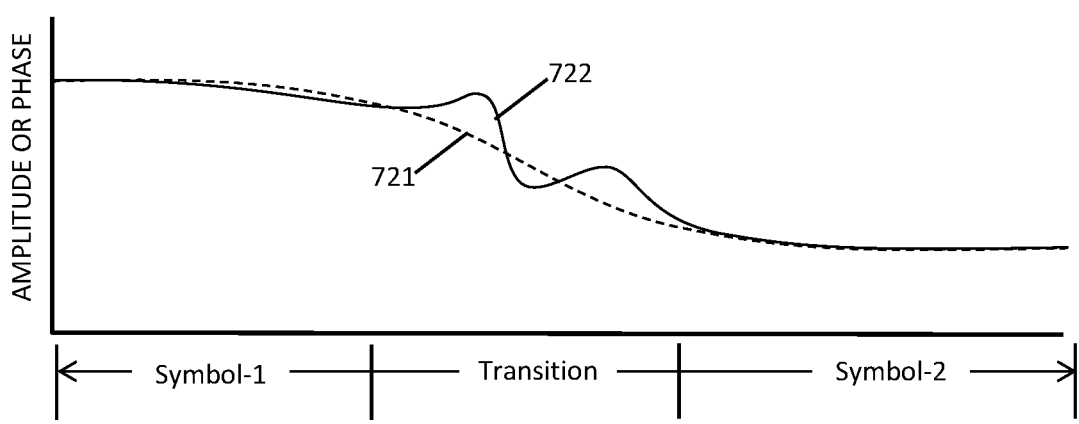
FIG. 7C is a schematic showing an exemplary embodiment of a running amplitude during a symbol transition with and without interference, according to some embodiments.

FIG. 7C is a schematic showing an exemplary embodiment of a smoothed running amplitude during an inter-symbol transition with and without interference, according to some embodiments. As depicted in this non-limiting example, a smoothed schematic (with sine wave suppressed) of an interference-free transition 721 is shown in dash, along with a strongly irregular transition 722 with interference. Thus the smooth transition 721 may correspond to the waveform of FIG. 7A, while the noisy transition 722 may correspond to the waveform of FIG. 7B. The receiver can measure the transition variations and thereby determine whether interference is present in the adjoining message elements.

As a further detection method, a faulted message element may be identified according to an anomalous polarization due to interference, as shown in the following example.

Figure 8:
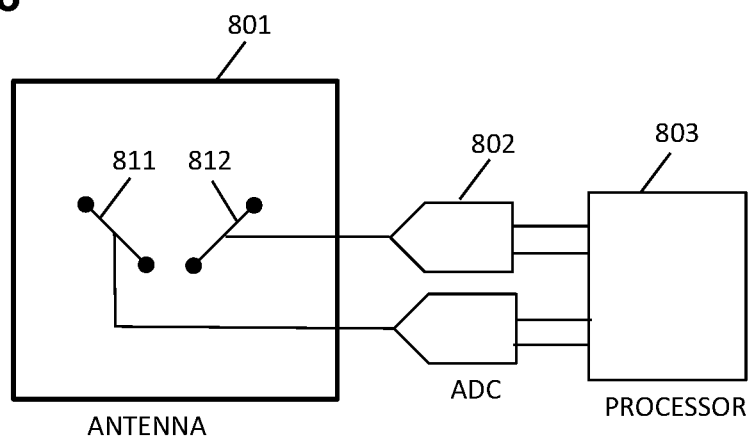
FIG. 8 is a schematic showing an exemplary embodiment of a schematic for polarization fluctuation detection, according to some embodiments.

FIG. 8 is a schematic showing an exemplary embodiment of a circuit for detecting a change in the polarization of a signal, according to some embodiments. As depicted in this non-limiting example, an antenna 801 includes two sensor elements 811, 812 oriented to detect two different electromagnetic polarizations (at ±45° in this case). The sensor elements 811, 812 are connected to two analog-to-digital converters (ADC) 802 which digitize the two polarization signals and feed them to a processor 803. The processor 803 measures the power or amplitude received in the two polarization directions and forms a ratio. An intruding signal, with different transmission or propagation history, may alter the polarization of the received waveform. Therefore the receiver can detect a faulted message element according to the polarization ratio.

An additional way for a receiver to detect a fault pertains to the modulation state of the received message element, as explained in the following example.

Figure 9:
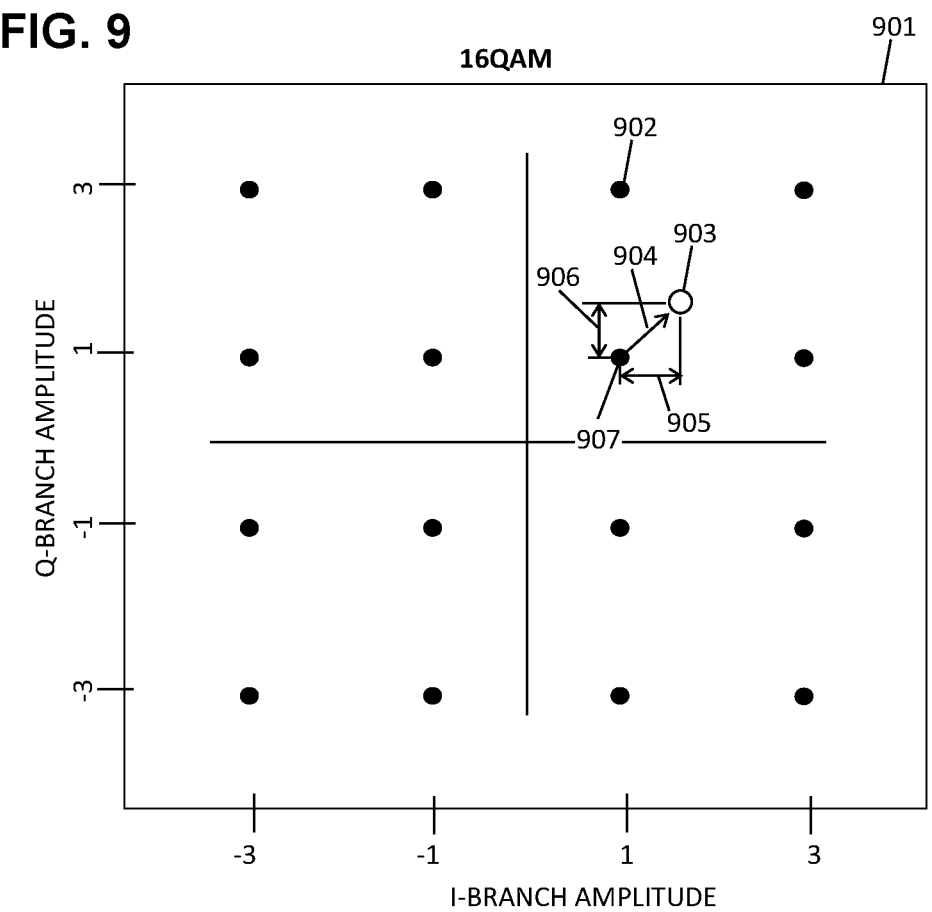
FIG. 9 is a schematic showing an exemplary embodiment of a 16QAM constellation chart including interference, according to some embodiments.

FIG. 9 is a schematic showing an exemplary embodiment of a 16QAM constellation chart, according to some embodiments. As depicted in this non-limiting example, a constellation chart 901 of 16QAM includes the 16 allowed states 902 arranged by I-branch and Q-branch amplitudes. The transmitter transmits each message element according to one of the allowed states 902, but the receiver generally receives the message element with a displaced modulation due to noise and interference. In this case, a received message element is received with the modulation shown by a circle 903, which is displaced from the as-transmitted modulation state 907. The "overall modulation deviation" is the amount of displacement 904, which equals the root-sum-square of the I-branch modulation deviation 905 and the Q-branch modulation deviation 906. Thus the receiver can localize the faulted message element according to the sizes of the branch modulation deviations 905, 906 or by the overall modulation deviation 904.

In addition, the receiver can determine a phase rotation angle for each message element, according to a ratio of the I and Q branch amplitudes. Phase fluctuations can then show up as a variation in the phase rotation angle for different message elements, and are likely largest in the faulted one.

The figure shows a QAM modulation scheme. If, instead, the message is modulated in an amplitude-phase modulation scheme, the receiver can determine the modulation deviation according to the difference in amplitude between the waveform amplitude and the nearest amplitude level of the modulation scheme, and likewise for the phase modulation deviation.

The units of amplitude and phase are different, which may complicate the calculation of the overall deviation. Therefore the receiver can tally the amplitude fluctuations and the phase fluctuations separately. Alternatively, the receiver can "normalize" the amplitude deviations by dividing the difference by the level separation, that is, divide the difference between the received amplitude and the nearest predetermined amplitude level of the modulation scheme by the separation between adjacent amplitude levels. The phase difference may be normalized in the same way. Then the normalized difference values, which are unitless, can be combined or compared directly.

The modulation deviation can be determined in a similar way for other modulation schemes that involve predetermined modulation levels such as amplitude or phase levels. The modulation deviation can then be used by the receiver, generally in combination with other waveform parameters such as the amplitude and phase fluctuations of each message element, to localize the likely faulted message elements. Often the predetermined modulation levels of the modulation scheme are provided or exhibited to the receiver in a demodulation reference, which is preferably located close to or concatenated with the start of the message, and may also be embedded in the message, or included elsewhere proximate to the message.

The receiver can calculate an overall "suspiciousness" metric, by combining the phase fluctuations, the amplitude fluctuations, the amplitude and phase modulation deviations, and any other measurable parameter of the waveform, which may vary during the symbol-time as a result of noise or interference. Faulted message elements may be revealed by an increase in suspiciousness relative to the other message elements, since a faulted message element generally exhibits a larger fluctuation in at least one waveform parameter. The receiver can thereby localize the faults and attempt a correction without resorting to a costly retransmission.

Figure 10:
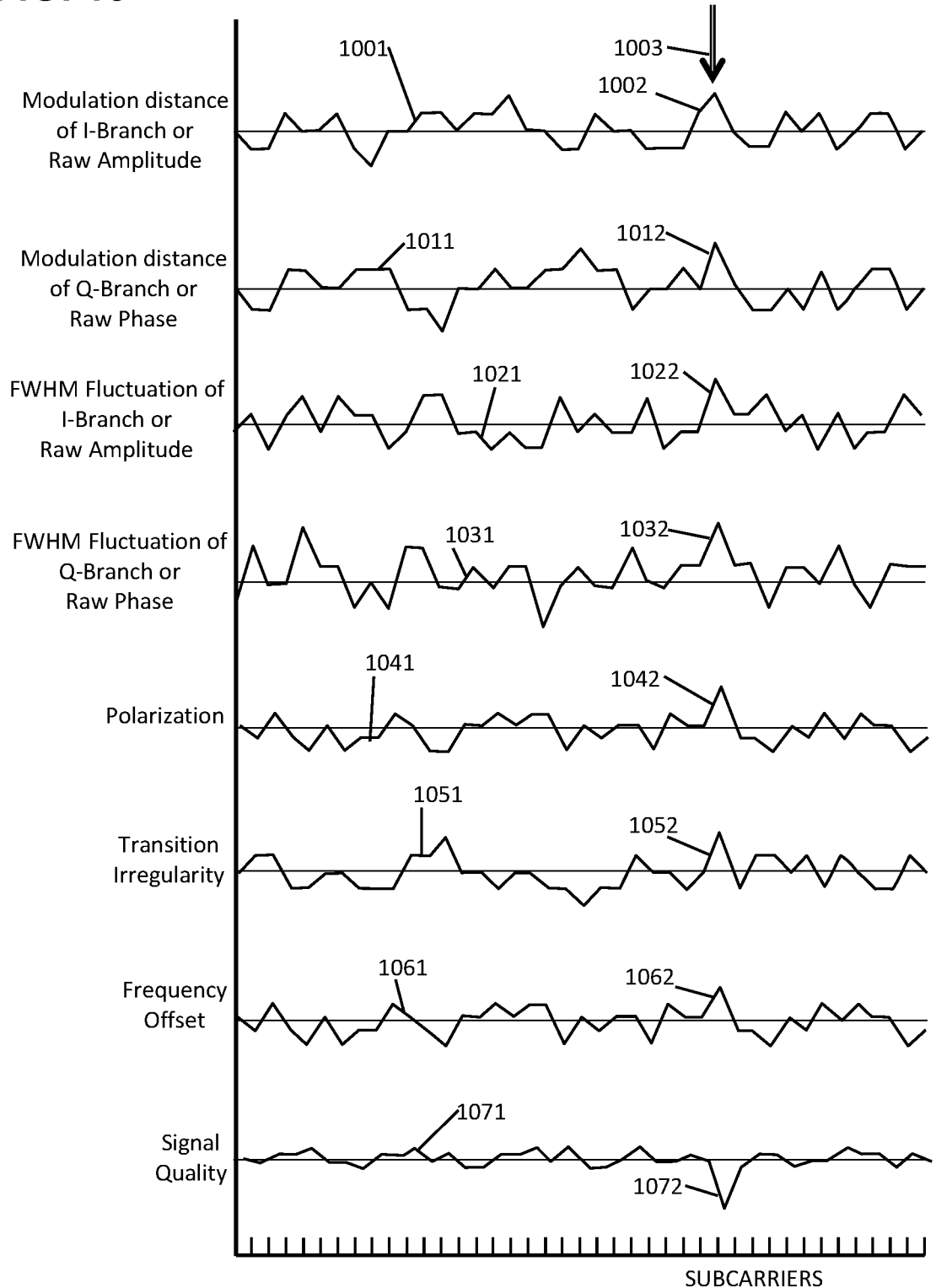
FIG. 10 is a schematic showing an exemplary embodiment of the suspiciousness parameters of the message elements in a message, according to some embodiments.

FIG. 10 is a schematic showing an exemplary embodiment of the waveform parameters contributing to a signal quality determination for each message element in a message, according to some embodiments. As depicted in this non-limiting example, various parameters of the waveform of each message element of the message are plotted against the horizontal axis representing the subcarriers of the frequency-spanning message. Thus the chart spans all of the message elements in the message.

The first line 1001 represents the amplitude modulation deviations of the raw amplitudes received by the message elements (if amplitude-phase modulation) or the Q-branch amplitude modulation deviations (if QAM). The amplitude of the waveform can be measured at multiple times within each message element, thereby determining both an average amplitude (for determining the modulation deviation) and a fluctuation distribution width, such as the FWHM of an amplitude distribution, as discussed in FIG. 2B. A narrow-band burst of interference 1003, occupying a single subcarrier, is indicated by an arrow 1003. Accordingly, a small enhancement 1002 of the amplitude modulation deviation is present at the subcarrier of the interference.

The second line shows the modulation deviation 1011 of the phase (if amplitude-phase modulation) or the I-branch amplitude modulation deviation (if QAM). Again there is evidence of a small enhancement 1012 due to the interference 1003. A waveform phase can also be determined for QAM message elements according to a ratio of the I and Q branch amplitudes, which is geometrically related to the amplitude deviations of the two branches. For example, the QAM modulation scheme specifies a certain ratio of the branch amplitudes of each allowed modulation state, whereas phase noise causes a rotation in I-Q space which can be measured according to the ratio of the branch amplitudes. In each case, the distortion is expected to be larger, in general, for the faulted message element than for the non-faulted message elements.

The third line 1021 shows the FWHM fluctuation width of the raw waveform amplitude or the I-branch amplitude within each message element, with possibly a slight enhancement at 1022 at the interference.

The fourth line 1031 shows the FWHM phase fluctuation of the raw waveform or the Q-branch amplitude fluctuation, with again a small and unconvincing enhancement 1032 corresponding to the interference.

The fifth line 1041 shows the polarization of the received waveform, relative to the mean. Interference can cause polarization changes due to propagation differences between the interfering signals. The polarization of the received waveform can be determined in an antenna equipped with two orthogonal sensor elements, each sensor element gathering RF energy from one linear polarization only. The receiver can compare the received signals in the two sets of polarized sensors, and can detect a localized change in the polarization ratio, which may indicate that the message element has significant interference. As depicted, the polarization change at the faulted message element, due to the interference, is marginally noticeable at 1042.

The sixth line 1051 is a measure of the smoothness of the transition regions adjacent to the symbol-time of each message element. The transition waveform can be distorted by signals from two different sources at different distances or with different timebases, resulting in distortions in the transition region when the amplitudes are changing, which a receiver can detect. For example, the transition between one resource element and a subsequent one at the next symbol-time, as received, is generally smooth and monotonic. The receiver, after separating the subcarrier signals in a single OFDM symbol, can determine whether the transitions are smooth and monotonic, or structured by interference or other pathology. Thus the inter-symbol transitions on one or both sides of each message element can reveal a likely faulted signal. In the depicted case, a small enhancement 1052 is shown at the faulted message element.

The seventh line 1061 indicates the frequency offset, relative to the subcarrier frequency, as measured in each message element. The size of a frequency offset is limited by the narrow-band digital filter. In this case, a small frequency skew indicates possible interference at 1062. The frequency offset can be quantified by calculating the Fourier transform of the digitized waveform, in which the digitization clock is controlled by the receiver's local oscillator. A small frequency offset which is uniform throughout the message is probably indicative of a local oscillator lock problem, not interference. However, if the frequency offset of one message element is significantly larger than the other message elements, that one is likely faulted.

The last line shows the overall signal quality 1071, determined by combining the listed measurements, plus optionally other waveform diagnostics. The signal quality may be the negative of the sum or magnitude of the individual characteristics, so that a larger amplitude deviation results in lower signal quality. The combining may include taking the magnitude of certain effects that indicate interference regardless of sign, such as the polarization change or the frequency offset. The combining may include averaging or summing or other ways of including each diagnostic result.

In the depicted case, although each of the individual parameters showed only a relatively weak effect of the interference 1003, the enhancement 1072 in the combined metric is obvious. That is because the combining tended to average over the random small variations of the non-faulted message elements, while the faulted message element included contributions from many of the separate tests, thereby enhancing the significance of the negative signal quality peak, and resulting in a clear indication of the fault.

In some measurements, the effect of interference may be negative rather than the positive excursions shown here. In that case, the receiver may combine the various measurements in magnitude, so that both positive and negative excursions contribute equally to the overall suspiciousness. For example, the various parameters can be added in magnitude, or as a root-sum-square, or other formula for averaging random fluctuations while constructively combining shared enhancements, so as to produce a significant peak only at the faulted message element. For further clarity, the receiver may subtract the average suspiciousness of the message element, thus reducing the random variations to nearly zero, while leaving the interference peak 1072 to stand alone.

As an alternative way of presenting the measurements, the data for each message element may be charted as a histogram, as disclosed below.

Figure 11A:
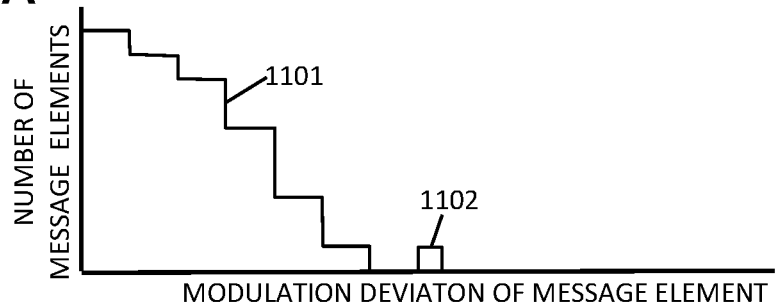
FIG. 11A is a histogram showing an exemplary embodiment of a distribution of the modulation deviation of a series of message elements, according to some embodiments.

FIG. 11A is a histogram showing an exemplary embodiment of a distribution of the modulation deviations of a series of message elements, according to some embodiments. As depicted in this non-limiting example, the histogram 1101 is a chart showing the number of message elements with each value of the modulation deviation. The modulation deviation, in this example, is the magnitude of the distance between the received modulation value and the nearest allowed modulation level, for amplitude and phase modulation levels. Most of the message elements have modulation deviations that are relatively small, clustered toward the left side of the distribution. This indicates that most the received message elements had low noise and thus were close to the predetermined modulation levels. However, a single message element 1102 is seen at a significantly higher modulation deviation, raising suspicion that it is faulted. Now, if the message is subsequently found to agree with its error-detection code, then the outlier 1102 would be assumed to be correctly demodulated despite its large modulation deviation. But, if the message fails the error-detection test, then at least one message element is faulted, in which case the outlier message element 1102 is the most likely suspect.

Figure 11B:
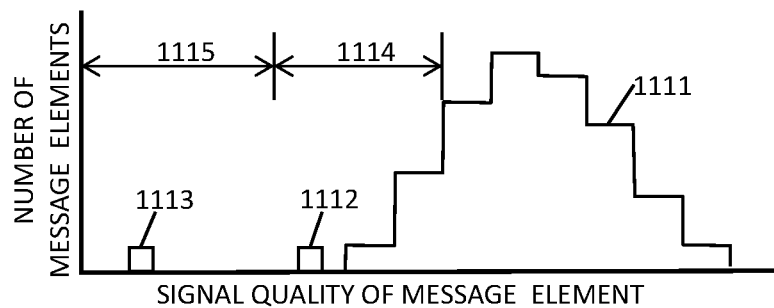
FIG. 11B is a histogram showing an exemplary embodiment of a distribution of the signal quality of a series of message elements, according to some embodiments.

FIG. 11B is a histogram showing an exemplary embodiment of a distribution of the signal quality of a series of message elements, according to some embodiments. As depicted in this non-limiting example, the signal quality of each message element is a combination of the amplitude and phase signal fluctuations (such as the FWHM width of the distribution within each message element, and the peak position of that distribution), the amplitude and phase modulation deviations (relative to the predetermined amplitude and phase levels of the modulation scheme), an inconsistent polarization or inter-symbol transition parameter or a frequency offset, and possibly other contributions to the signal quality distribution. Signal quality is opposite to suspiciousness; the smaller the fluctuations, the higher the signal quality. In this case, the distribution 1111 shows that most of the message elements have a high signal quality, but the distribution has a substantial width due to the presence of noise and measurement uncertainty, for example. In addition, two outlier message elements 1112, 1113 have substantially lower signal quality. If the message agrees with its error-detection code, then the outliers 1112, 1113 would be assumed to be correctly demodulated despite their low signal qualities. But if the message fails the error-detection test, one or both of the outliers is/are likely faulted. The receiver can then alter them to other allowed states of the modulation scheme, to seek the correct message content, while optionally exploiting the information in an error-detection code to reduce the number of alterations required to reach agreement.

Also shown are two defined ranges of signal quality 1114 and 1115. Message elements having a signal quality in the range 1114 may be allocated to a "possibly faulted" category, whereas any message elements in the 1115 range can be allocated to a "likely faulted" category.

Correcting a Faulted Message Element

The following examples show how the disclosed methods can be used to correct the modulation value of a faulted message element.

Figure 12:
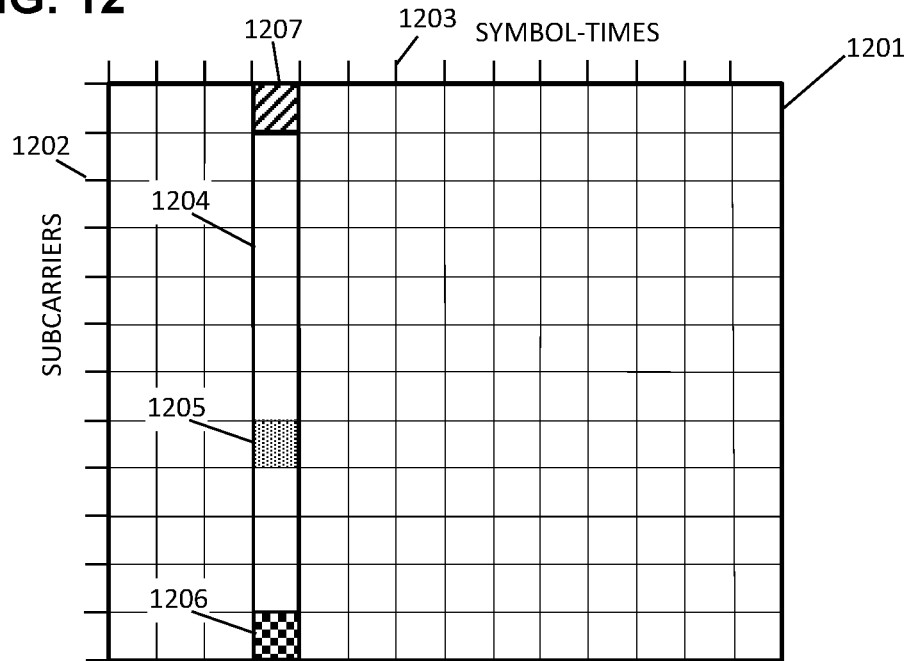
FIG. 12 is a schematic showing an exemplary embodiment of a resource grid containing a frequency-spanning message with a faulted message element, according to some embodiments.

FIG. 12 is a schematic showing an exemplary embodiment of a resource grid containing a frequency-spanning message with a faulted message element, according to some embodiments. As depicted in this non-limiting example, a resource grid 1201 is defined by subcarriers 1202 in frequency and symbol-times 1203 in time. A frequency-spanning message 1204 includes message elements, one message element per subcarrier, in a single symbol-time. One of the message elements 1205 (stipple) is faulted; its signal is distorted by noise or interference to the extent that its modulation state is incorrectly demodulated by the receiver.

The message 1204 may include an error-detection code 1206 (checkerboard hatch). For example, the error-detection code 1206 may be a parity construct fitting in a single resource element as shown. The error-detection code may be configured to indicate that a fault exists in the message, without attempting to localize or correct the fault. The receiver can use the waveform fluctuations and modulation deviation values to identify the faulted message element, and can then calculate the corrected modulation of the faulted message element according to the error-correction code. Thus soon as the single faulted message element has been determined, its correct value can readily be calculated by "working backwards" from the error-detection code. When calculated in this way, the receiver can clear the fault by a rapid and low-cost method that guarantees that the mitigated message will agree with its error-detection code. Thus a single faulted message element can be mitigated using a short parity construct 1206 as shown, without calling for a retransmission, and without bulky CRC or FEC codes.

If the message has more than one fault, the receiver can apply further mitigation based on the form and format and content and meaning of the message, as described below.

In some embodiments, the message may include two parity constructs, one at each end of the message. The first parity construct may sum bit values in the message and in the second parity construct, while the second parity construct may sum bit values in the message and in the first parity construct. In this way, a single-point fault can be identified according to the waveform, and can be corrected according to one of the parity constructs, while the success of that mitigation may be checked by the second parity construct.

The message may include a demodulation reference 1207 (diagonal hatch). The receiver may use the demodulation reference 1207 to recalibrate the predetermined modulation levels of the modulation scheme. The demodulation reference 1207 may occupy just a single resource element, as shown. For example, the demodulation reference 1207 may be a short-form demodulation reference exhibiting the maximum and minimum predetermined amplitude levels of the modulation scheme, such as the two branch amplitudes of a QAM state, from which the other amplitude levels can be calculated by interpolation.

The receiver can determine that the message 1204 includes at least one faulted message element if the message disagrees with the error-detection code 1206. If there is no error-detection code, then the receiver can attempt to detect the fault by determining whether the message 1204 makes sense in the context it was received, or if it violates a format or other expected convention, or by another diagnostic based on the content of the message. In such cases, the signal fluctuations or the modulation deviations may indicate which message element is most likely faulted. In each case, the receiver can attempt to mitigate the fault by altering the modulation state of the most likely faulted message element and re-testing the altered message.

In the depicted example, the message 1204 includes no FEC codes because they generally take up an inordinate amount of resource elements. In addition, FEC codes may be unnecessary if the receiver can localize and correct the fault based on the waveform. In that case, the receiver can localize the faulted message element and then correct it to comply with the single-element parity code 1206.

In other embodiments, the message may include a CRC or FEC code. In that case, the receiver may use the CRC or FEC codes in combination with the suspiciousness or signal quality determinations to cooperatively localize and rectify the faulted message element or elements. Once the faulted message element has been identified, the error-detection code may be sufficient to determine the corrected value of the faulted message element. In a short message, an error-detection code occupying a single resource element may be a small cost for improving the communication reliability. For larger messages, CRC or FEC codes, or alternatively a plurality of single-element parity constructs, may be provided, such as embedded in the message. The codes may be used by the receiver in cooperation with the waveform signal quality analysis, to accelerate the fault mitigation in combination with the waveform analysis.

Applications that are already committed to using CRC or FEC codes for fault detection can enhance their mitigation operations further by including the waveform analysis, and may thereby rapidly localize the fault and determine the corrected value. In addition, the waveform data can also be used to clear any ambiguities about the correct value of the faulted message elements. The waveform analysis and mitigation, coupled with CRC or FEC codes if present, can thereby repair a corrupted message, in real-time, by the receiver alone, at negligible cost, according to some embodiments.

Figure 13:
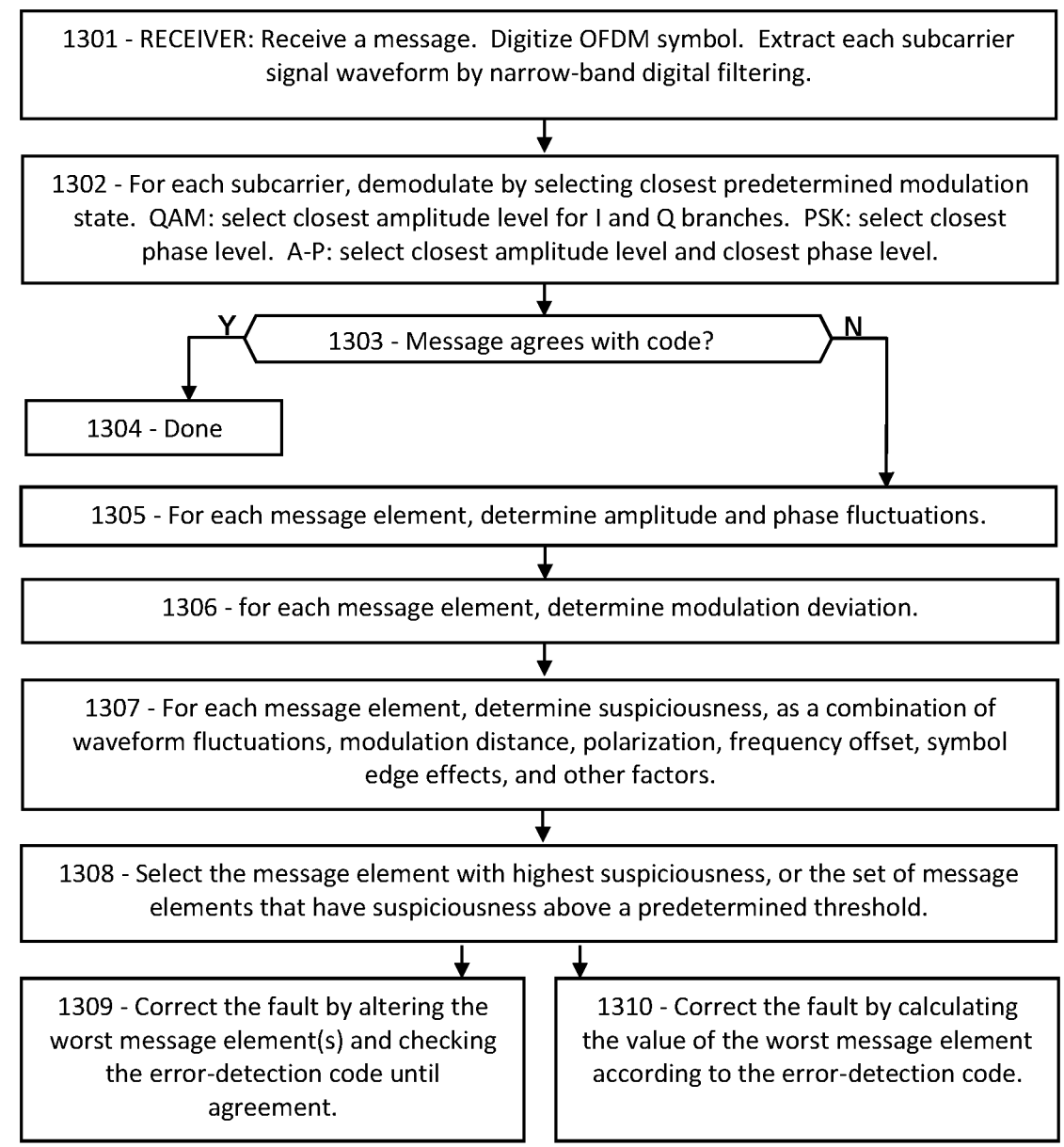
FIG. 13 is a flowchart showing an exemplary embodiment of a procedure for mitigating a faulted message element, according to some embodiments.

FIG. 13 is a flowchart showing an exemplary embodiment of a procedure for mitigating a faulted message element, according to some embodiments. As depicted in this non-limiting example, a receiver receives a message and, if corrupted, finds the faulted message element by waveform analysis, followed by mitigation.

At 1301, the receiver receives a message having multiple message elements, each message element modulated according to a modulation scheme involving amplitude or phase modulation or both. The message is frequency-spanning, that is, an OFDM symbol occupying multiple subcarriers at a single symbol-time, in which all the subcarrier signals of the message (and other simultaneous signals) appear superposed. The receiver digitizes the OFDM symbol (optionally after frequency downshifting) and extracts each subcarrier waveform by narrow-band digital filtering, thereby producing a signal waveform for each subcarrier message element. Alternatively, the receiver may digitize the OFDM signal, apply the digital filtering to that composite signal, and determine the amplitude and phase of the subcarrier signal that way.

At 1302, the receiver demodulates the message. For each subcarrier, the receiver measures the signal amplitude or phase, or other modulation parameter, and compares to a set of predetermined amplitude or phase levels, selecting the closest predetermined level. If the message is modulated in a QAM modulation scheme involving orthogonal amplitude-modulated branch signals, the receiver separates the two branches and selects the closest predetermined amplitude level for each branch. If the modulation scheme is PSK, the receiver determines the phase and compares to a set of predetermined phase levels. If the modulation scheme is amplitude-phase ("A-P") modulation, the receiver determines the amplitude and phase of the waveform and compares to predetermined amplitude and phase levels. In each case, the receiver determines the modulation state of the message element according to the closest modulation state, or the closest predetermined amplitude and phase levels, of the modulation scheme.

At 1303, the receiver calculates a digest or hash of the demodulated message and compares to an error-detection code, such as a CRC or FEC or parity construct, associated with the message. If there is agreement, the task is done at 1304. If not, at 1305 the receiver attempts to localize and correct the faulted message element or elements.

At 1305, the receiver analyzes the waveform of each message element. The receiver determines the fluctuation in waveform parameters, such as the fluctuation in amplitude and phase, across the symbol-time of each message element. At 1306, the receiver determines the modulation deviation, or difference between each message element's received modulation and the predetermined modulation states of the modulation scheme. The modulation deviation may be a sum or magnitude or square or other combination of distances, each distance being the difference between the received amplitude or phase or branch amplitude, and the closest predetermined amplitude or phase or branch amplitude level of the modulation scheme.

At 1307, the receiver determines a "suspiciousness" of each message element by combining the waveform fluctuations and the modulation deviations. (In another embodiment, the receiver may determine a signal quality related to the fluctuations and modulation deviations and the other listed parameters, wherein high signal quality corresponds to small fluctuations and small modulation deviations.) Other parameters may be included, such as polarization, symbol transition effects, and frequency offset of the subcarrier signal. In addition, if the error-detection code includes information about which elements are most likely to be faulted, that information can be included in the overall suspiciousness assessment. However, the procedure can also work if no error-detection code is available or if the error-detection code provides no information regarding the location of the faulted message element.

At 1308, the receiver determines the "worst" message element having the highest suspiciousness (or lowest signal quality) and presumes that the worst message element is faulted. Alternatively, the receiver can select all of the message elements that have suspiciousness above a predetermined threshold.

At 1309, the receiver can attempt to correct the fault by altering the modulation state assigned to the worst message element. For example, the receiver can alter the assigned modulation state to another allowed state that is next-closest to the received modulation parameters, wherein the next-closest state is the state that is closest to the received modulation parameters other than the closest one. The receiver can then compare the altered message, or a digest or hash thereof, to the error-detection code, and thereby determine whether the altered message is correct. The receiver can proceed to alter the assigned state of the message element to each of the other allowed states in the modulation scheme, testing each version against the error-detection code. If none of the fluctuations agrees with the code, the receiver can alter the assigned states of the other message elements that have high suspiciousness, in a nested search that tests each combination of suspicious message elements at each allowed modulation state of the modulation scheme, and may thereby correct the message if possible. If none of those versions agrees with the error-correction code, the receiver can then request a retransmission, and can process the retransmitted version in the same way. If the retransmitted version is also faulted, the receiver can assemble a "merged" message by selecting, from the corresponding message elements of the two received versions, the one that has the lower suspiciousness. The receiver can test the merged message against either of the received error-detection code versions to finally mitigate the fault.

Alternatively, at 1310, the receiver can use the error-detection code to calculate the correct modulation value of the worst (most suspicious) message element, and attempt to mitigate the message. Thus if the message has a single fault only, the receiver may calculate it directly, without trying multiple alterations, according to the error-detection code.

Optionally, the receiver can count how many message elements have suspiciousness above a predetermined threshold, and if that number is above a predetermined limit, the receiver may then request a retransmission instead of embarking on a likely futile nested search through the modulation states.

In many cases, a receiver can recover the true message based on waveform suspiciousness and, if necessary, a limited number of alteration tests, thereby avoiding a costly retransmission. In many cases, the message can be recovered even in noisy environments with poor reception, using a brief parity construct. With such an error-detection code, the receiver can thereby obtain high communication reliability while avoiding the burden of FEC codes and the like.

The waveform analysis procedures disclosed herein may enable higher reliability and/or wider range of coverage by enabling the receiver to localize a faulted message element and correct it.

Figure 14:
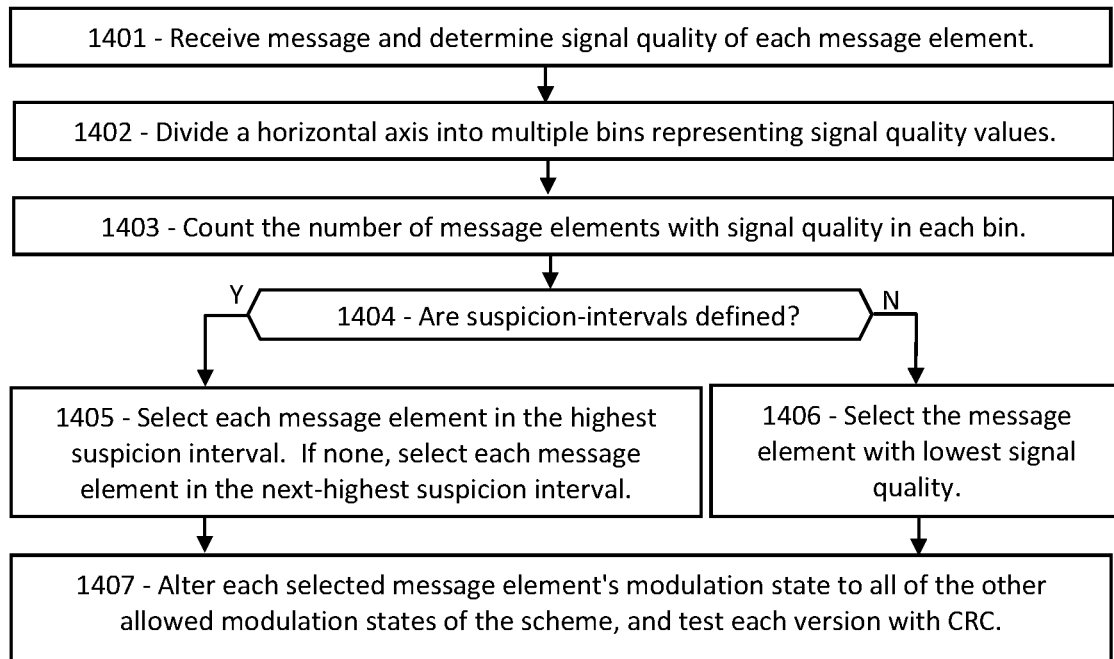
FIG. 14 is a flowchart showing an exemplary embodiment of a procedure for determining a distribution of the signal quality of each message element, according to some embodiments.

FIG. 14 is a flowchart showing an exemplary embodiment of a procedure for determining a distribution of the signal quality of each message element, according to some embodiments. As depicted in this non-limiting example, at

1401 a receiver can receive a message and determine the signal quality of each message element, using a procedure such as that of FIG. 9, for example.

At 1402, prepare the histogram by dividing the horizontal axis into a number of equal-width signal quality bins. Then at 1403, allocate each message element to the bin corresponding to its signal quality, and then count the number of message elements in each of the histogram bins.

At 1404, determine whether certain "suspicion intervals" of low signal quality have been defined. If so, at 1405 select each message element in the interval representing the lowest signal quality. If none of the message elements is in the lowest interval, select each message element in the next-lowest signal quality interval. If, however, no suspicion intervals are defined, then instead at 1406 select the one message element that has the lowest signal quality.

At 1407, alter each of the selected message elements to each of the allowed states of the modulation scheme, starting with the message element that has the lowest modulation quality. Initially alter it to the allowed state that is closest to the message element's modulation (without repeating the already-tested versions). Compare each version with the error-detection code to find the correct message content.

Alternatively, if there is just one message element with low signal quality, and therefore is likely the faulted one, and if there is an error-detection code, then the receiver may directly calculate the correct value of the faulted message element according to the error-detection code.

Figure 15:
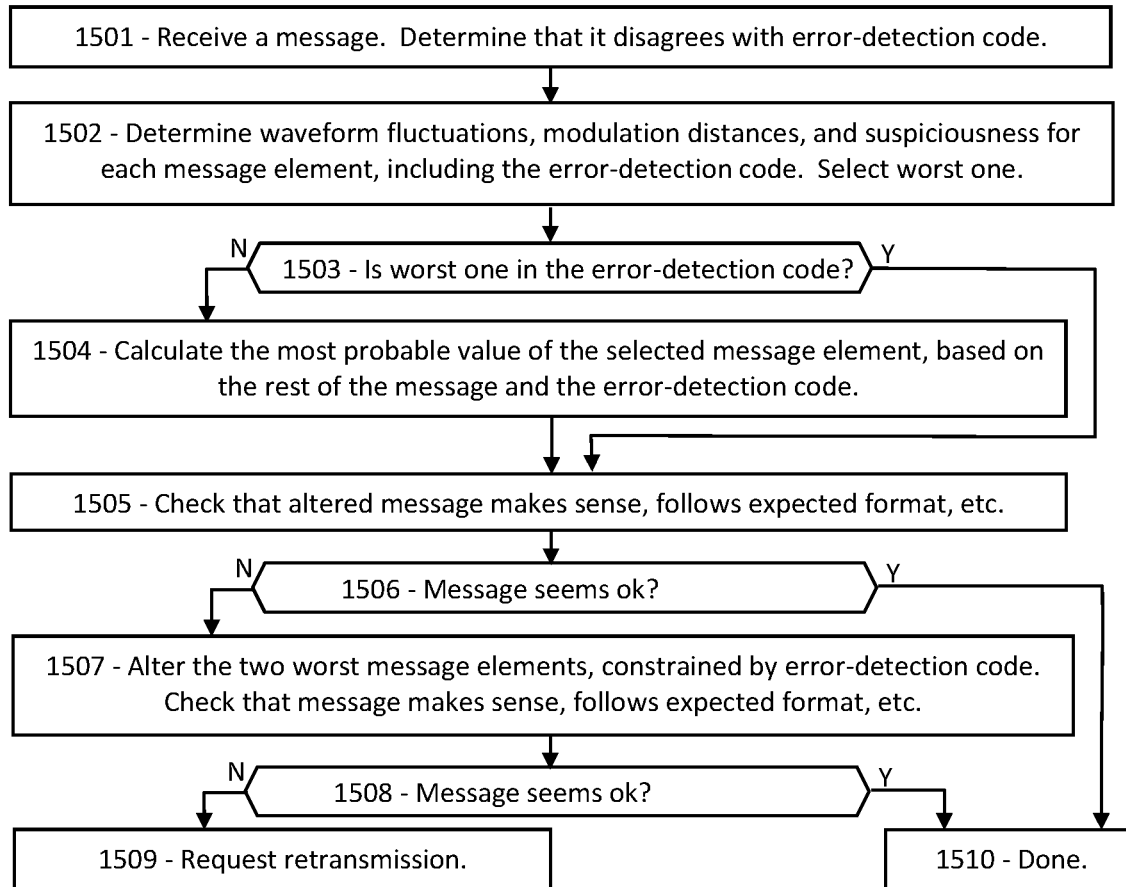
FIG. 15 is a flowchart showing an exemplary embodiment of a procedure for determining which message element is faulted, according to some embodiments.

FIG. 15 is a flowchart showing an exemplary embodiment of a procedure for determining which message element is faulted, according to some embodiments. As depicted in this non-limiting example, a receiver attempts to correct a faulted message using waveform fluctuation measurements, modulation deviations, and an associated error-detection code.

At 1501, the receiver receives the message, demodulates it, compares the message (or a digest or hash thereof) to an error-detection code (such as a CRC or FEC or parity construct) associated with the message, and determines that the message disagrees with the error-detection code, and hence there is at least one faulted message element.

At 1502, the receiver determines the waveform fluctuations, modulation deviations, and suspiciousness of each message element. The receiver then selects the "worst" message element having the highest suspiciousness.

In evaluating the suspiciousness of the message elements, the receiver includes the error-detection code resource elements as well. That is, the receiver determines the suspiciousness of each resource element of the error-detection code, because the error-detection code may be faulted. Occasionally one of the error-detection elements may be corrupted even if the rest of the message is intact. If so, the receiver may ignore the error-detection code.

At 1503, the receiver determines whether the worst message element is in the error-detection code. If so, then the error-detection code cannot be trusted, and the flow proceeds to 1505 below.

However, if the worst message element is not part of the error-detection code, then at 1503 the worst message element must be somewhere in the rest of the message, and the error-detection code may be assumed to be correct. Therefore at 1504 the receiver can calculate the correct value of the worst message element according to the error-detection code. For example, the receiver can subtract the values of the other message elements, other than the worst one, from the error-detection code, thereby determining the correct value of the worst message element. Or, if the error-detection code is a more complicated function of the message data, the receiver can sequentially step through all of the modulation states, in place of the worst one, and can check each version against the error-detection code, and thereby determine the correct value of the worst message element. In either case, the receiver can rapidly determine the correct value of the single faulted message element. If there are two likely faulted message elements, the receiver can alter one of them to all the modulation states while calculating the other one according to the error-detection code, and determine which version obeys format requirements and the like.

Then, at 1505, the receiver checks that the reconstructed message makes sense in the context of the relevant application, and follows expected forms and formats, and has no parameters out of range, and other logical tests to reveal remaining errors. If at 1506 the message passes these tests ("seems ok") then the task is done at 1510. If not, then the receiver can attempt to reconstruct the message by altering the two worst message elements as follows.

At 1507, the receiver determines which two message elements are the worst two, having the highest suspiciousness. The receiver then sequentially alters the modulation state of one of the worst two, and calculates the value of the other one according to the error-detection code, as described above. The receiver then checks that the content, format, and so forth are as expected at 1508. If exactly one of the alterations produces a satisfactory version, the task is done at 1510. If none of the alterations produces a satisfactory version of the message by these criteria, or if two of the versions are equally satisfactory, then in desperation the receiver requests a retransmission of the message at 1509.

Thus the receiver has attempted to correct the message by deriving the value of the most likely faulted message element according to the error-detection code, and if that fails, to alter the modulation state of the two message elements with the highest suspiciousness while applying the error-detection constraint. In addition, the receiver has applied a series of logical tests on the altered message to determine whether the fault mitigation was successful. If successful, this strategy may save substantial time and resources while enhancing communication range and reliability even with fading propagation and noisy electromagnetic environments.

Artificial Intelligence Waveform Analysis

A well-trained AI model can enhance the signal quality evaluation based on measurements of the waveform of each message element. For example, AI can sharpen the determination of the amplitude and phase fluctuation distributions. Often the distribution function of the faulted message element differs subtly from that of the non-faulted message elements. A receiver sensitized to the fluctuation distribution can thereby detect the fault.

The AI model can also sharpen the other waveform-based tests, such as the modulation deviation, the polarization ratio, the frequency offset, and symbol transition irregularities, by discerning subtle inconsistencies. Likely there are other waveform parameters or correlations that the AI model can discover for identifying the fault location, correlations that may never be known to humans due to the complexity but which can be exploited by a properly trained AI model.

The AI model can also manage the correlation of the multiple waveform measurements. Often a small irregularity appears in multiple different measurements, but it only becomes a significant fault indicator when all of the measurements are combined in a manner that the AI model can develop. Thus by developing correlation relationships among the various waveform measurements, the AI model can localize a faulted message element even when the overall data is highly noisy.

AI can also assist by checking proper form and format which are generally constrained by the type of the message. The AI model can also analyze the content and meaning of the message, and can thereby assess whether message makes sense in the context of the application. For example, the AI model can determine whether the message has been garbled or is somehow illegal or otherwise unexpected in the context, based on rules or format or out-of-range values, for example.

The AI model may be able to localize the faulted message element(s) based on the content or meaning of the message. For example, the AI model may interpret the intent of the message, based on its type and the context, and detect an inconsistent message element based on the expected meaning.

The AI model may also use historical data, such as prior messages received by this user, or prior commonly received bit sequences, or other patterns of message elements, to detect a fault. For example, the AI model can be trained using numerous prior unfaulted messages to this receiver, or other receivers in similar context, and compare the faulted message elements to the prior ones to find a likely fault location.

When properly configured and trained, the AI model can detect subtle correlations between the various test results, correlations that may be invisible to even an expert human investigator. The AI model can then exploit those correlations to optimize the validity of the final mitigation selection, and thereby rescue a corrupted message without the delays and costs of a retransmission.

The AI model may construct a matrix of probability values, in which each probability value is the probability that a particular message element is correctly demodulated according to a particular modulation state. The matrix thus includes all of the message elements of the message on one axis, and all of the modulation states of the modulation scheme on the other axis. The probability values may be based on the waveform tests and other inputs. The AI model may impose consistency on the probability values, so that each message element's sum of probability values is no greater than 1.0. The sum of probability values, for a particular message element, may be less than 1.0 due to severe distortion, and that may reveal the faulted message element. Alternatively, the message element may have two or more probability values corresponding to two or more different modulation states, which also indicates interference. The AI model may then localize the likely faulted message elements and can also select between multiple possible corrections according to the probability values of the faulted message element or elements.

The following examples show how an AI model can assist the waveform analysis, fault localization, and message recovery in real-time.

Figure 16:
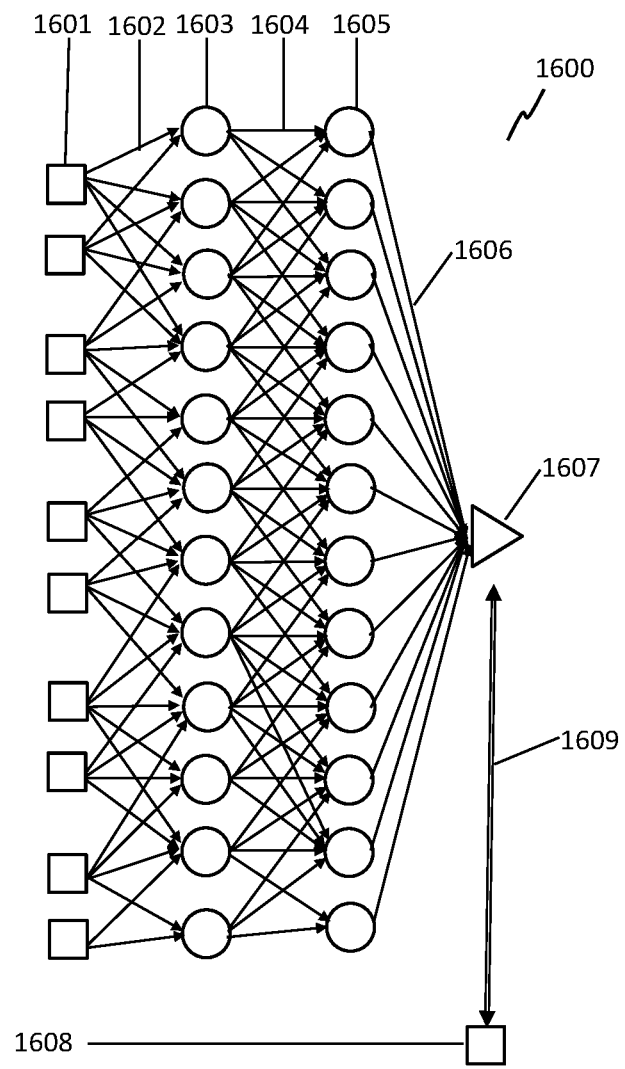
FIG. 16 is a schematic showing an exemplary embodiment of a neural net artificial intelligence model, according to some embodiments.

FIG. 16 is a schematic showing an exemplary embodiment of a neural net artificial intelligence model, according to some embodiments. As depicted in this non-limiting example, an AI structure 1600, depicted here as a neural net, has a number of inputs 1601, one or more intermediate layers of internal functions 1603, 1605 and one or more outputs 1607. The internal functions 1603, 1605 are operationally connected to the inputs 1601 and each other by links 1602, 1604, while the output 1607 is connected to the last layer of the internal functions 1606 by further links 1606. Although links are shown connecting only a few of the internal functions, in many AI structures each input and each internal function is linked to all of the internal functions of the succeeding layer. All of the links are unidirectional in this case; other embodiments include links going backwards and other complex topologies, although doing so can inhibit convergence.

The AI structure 1600 is turned into an AI "model" by adjusting numerous adjustable variables in the internal functions 1603, 1605. In some embodiments, the links 1602, 1604, 1606 can also include adjustable variables, while others are simple transfer links. The internal functions can include any type of calculation or logic relating the internal function's input link values to its output link values. In some embodiments, all of the output link values of a particular internal function are identical, while in other embodiments each link can have a different value and a different relation to that internal function's input link values.

The adjusting or "tuning" or "training" of the adjustable variables is generally performed using data related to the problem that the AI model is intended to solve. For example, if the AI model is intended to determine whether a particular message element is faulted, the data may include waveform amplitudes and phases, fluctuations in those parameters, modulation deviations relative to predetermined levels, and further inputs such as independently measured noise and interference levels, and the like. The resulting output 1607 may be a likelihood that the message element is faulted. This estimate is then compared 1609 to an independent determination 1608 or "ground truth" of the message element. The truth 1608 may be determined according to an unfaulted retransmission of the message, for example.

After each prediction is compared to the truth 1608, the adjustable variables are generally changed in some fashion, and the likelihood is recalculated. If the result is in better agreement with the truth 1608, the variables may be further adjusted in the same fashion, and if the prediction is worse they may be reversed or adjusted in some other way. After the output 1607 has reached a satisfactory agreement with the truth, another message element may be presented at the inputs, and the process may be repeated. Typically millions or billions of examples are required to achieve good performance. When completed, a well-trained AI model may be able to perform complex tasks better than even an expert human, and in a small fraction of the time, at negligible cost after development.

AI models tend to be most adept at solving problems that are highly complex, with multiple interacting or correlated parameters and highly nonlinear effects. In the context of waveform fault localization, AI may contribute beneficially in predicting which message elements of a message are most likely faulted. In addition, AI may be able to predict the correct value of the faulted message element by exploiting subtle and complex correlations in the input data. In addition, after accumulating data on multiple faults in multiple messages, another AI model may be trained to suggest when to switch to a different modulation scheme, and which scheme to use, based on the fault types observed, the QoS required, the size of messages, and other factors.

FIG. 17 is a flowchart showing an exemplary embodiment of a procedure for determining the probability that a message element is faulted according to the waveform of the message element, using an AI model, according to some embodiments. As depicted in this non-limiting example, an AI model 1702 takes, as input 1701, waveform data about the message element, such as fluctuations of the amplitude or phase observed during the message element, the amplitude and phase modulation deviations relative to a closest predetermined amplitude or phase level of the modulation scheme, the received amplitude for each message element, error-detection codes associated with the message, the measured polarization of the received message element, a frequency offset of each message element relative to the central frequency of the subcarrier, a measure of the smoothness or distortion of the waveform during transitions into and out of each message element's symbol-time, and possibly further parameters not directly related to the waveform such as the noise or interference levels (as measured during a non-transmission resource element, for example) and any demodulation references proximate to the message. The AI model may also take as input various threshold values, such as thresholds that indicate whether a particular waveform parameter or other parameter is an "outlier" and therefore more likely to be a fault. In addition, general inputs such as the numerology or bandwidth or time duration of the message element, the modulation scheme involved, and other data directly or indirectly related to message faults.

The AI model can also take as input a compilation of prior messages received by this receiver or similar receivers, a digest of the prior messages such as the occurrence of certain bit patterns or message element values, the form and format of the message, standards and rules governing how the message is to be configured, and other content-based information that may be correlated with a fault.

The AI model 1702 produces output 1703 including an estimate of the probability that each of the message elements is faulted. As an option, the AI model can also provide outputs such as a determination of the signal quality or suspiciousness of the message element based on the input data. In addition, the AI model, or another model using the same or similar input data, can estimate the uncertainty in each prediction. The uncertainty of the prediction is especially valuable because it indicates whether the prediction is to be trusted and acted upon, or discarded as unreliable. Most AI models lack this important capability, and fail to indicate the uncertainty of the results to the user.

Figure 18:
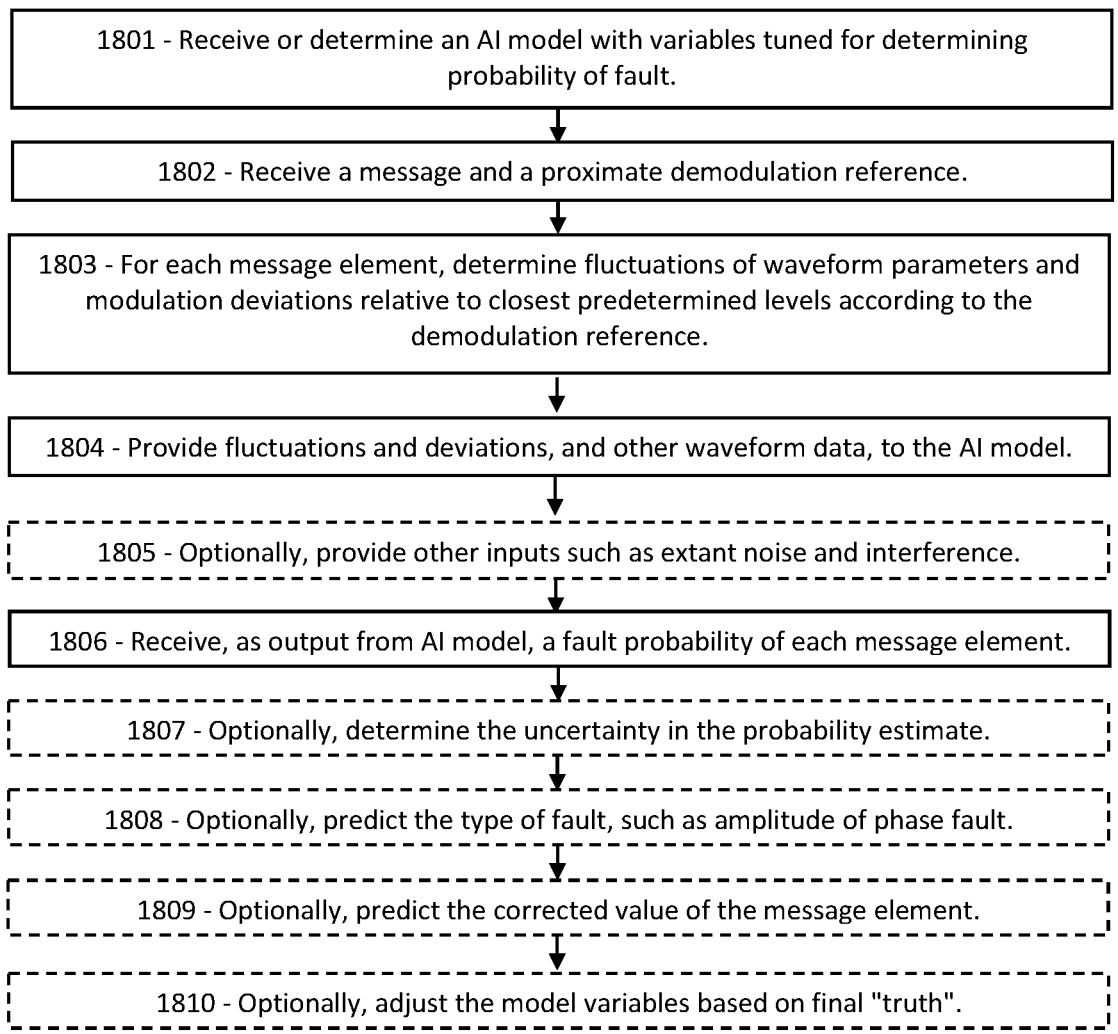
FIG. 18 is a flowchart showing an exemplary embodiment of a procedure for localizing a likely faulted message element, according to some embodiments.

FIG. 18 is a flowchart showing an exemplary embodiment of a procedure for localizing a likely faulted message element using an AI model, according to some embodiments. As depicted in this non-limiting example, at 1801 a wireless entity (base station, core network, user device, edge computer, or other wirelessly connected device) receives or determines or otherwise manages to use an AI model. The AI model includes a number of adjustable variables which have already been tuned (usually by another entity such as a supercomputer). The AI model is configured to determine the probability that each message element of a received message is faulted, based on the message element's waveform properties, message content, and other data.

At 1802, if not sooner, the wireless entity receives a demodulation reference which is concatenated with or embedded in or sufficiently proximate to the message, to serve as a fresh calibration of modulation levels for demodulating the message elements.

At 1803, each message element is demodulated by comparing its modulation state (or its amplitude or phase modulation values) to the predetermined modulation levels as determined from the demodulation reference (or derived or calculated therefrom), and selecting the predetermined modulation level closest to the message element's modulation. Then the waveform parameters of the message element's signal are analyzed to determine the fluctuations in amplitude or phase (or other waveform parameter) within the symbol-time of the message element, and also to determine the modulation deviations, in amplitude and/or phase of the message element signal relative to the closest predetermined amplitude or phase levels of the modulation scheme.

At 1804, the amplitude and phase fluctuation data, and the modulation deviation data, and optionally other data related to the waveform, and optionally other data not related to the waveform, are provided as inputs to the AI model. Optionally at 1805, certain operational or user-centric parameters such as the user's requested QoS, or a preference regarding retransmissions versus fault repairing, or a delay tolerance for example, are provided as further inputs.

At 1806, the AI model is executed on the input data and generates an output consisting of an estimate of the probability that each message element is faulted. Optionally 1807, the AI model can determine the uncertainty in the probability estimate, since an uncertain estimate is not as valuable as a high-confidence prediction. Optionally 1808, the type of fault (amplitude or phase, adjacent or non-adjacent, etc.) can be determined as well. This may lead to appropriate mitigation such as changing the modulation scheme if the fault rate gets too high. Optionally 1809, the AI model can consider the message content, using previous messages of a similar type, correlating most-probable and most-improbable bit sequences or symbol sequences according to message type, and/or the types of faults currently being detected in the network, for example.

Optionally 1810, the entity can attempt to refine the AI model by adjusting the model variables according to whether the prediction is correct or incorrect regarding the fault probability of each message element. For example, if the AI model predicts, with high certainty, that a particular message element is faulted, and it later turns out that the message element is not faulted, the model may need some fine-tuning to avoid such errors in the future. Alternatively, if the prediction is correct, then the model variables related to the prediction may be "firmed", that is, made more resistant to future adjustment, to avoid losing the high-quality predictive power.

Figure 19:
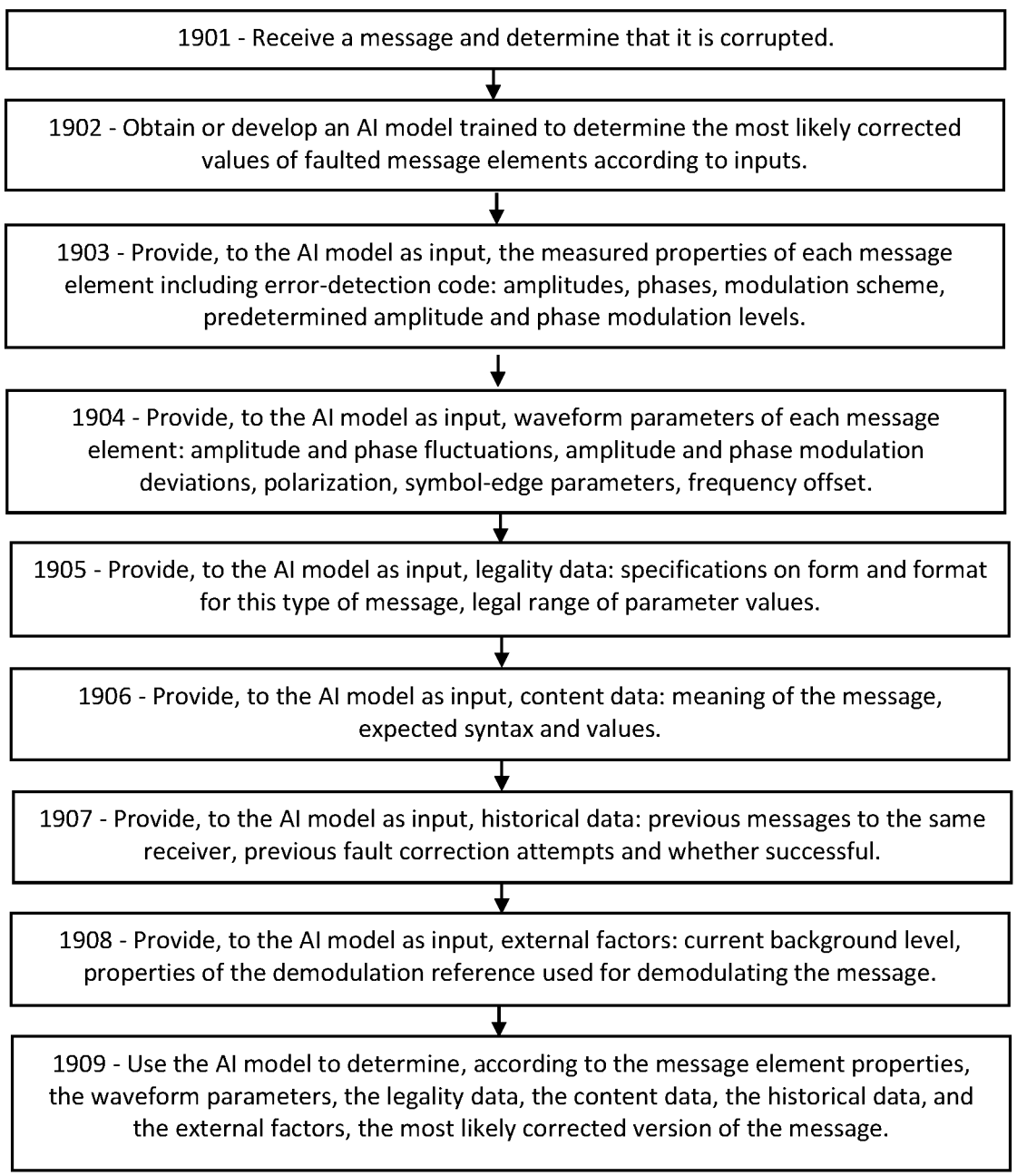
FIG. 19 is a flowchart showing an exemplary embodiment of a procedure for correcting a corrupted message using an AI model, according to some embodiments.

FIG. 19 is a flowchart showing an exemplary embodiment of a procedure for correcting a corrupted message using an AI model, according to some embodiments. As depicted in this non-limiting example, at 1901 a receiver receives a message and determines that it is corrupted. The determination may be based on an associated error-detection code, an illegal value in the message content, or other indicator of corruption.

At 1902, if not sooner, the receiver (or an associated processor) obtains or develops or otherwise arranges to use an artificial intelligence model. The AI model has already been trained for determining a corrected version of a message, based on a large amount of previous input data on similar types of messages.

At 1903, the receiver provides, as input to the AI model, data on the measured properties of each message element of the corrupted message. For example, the measured properties may be the amplitudes and/or phases (depending on the modulation scheme), the predetermined modulation levels (according to a proximate demodulation reference), and other measured properties of each message element for demodulation. The error-detection code, if present, is included in the measured properties data.

At 1904, the receiver provides, as further input to the AI model, waveform parameters of the signal in each message element. For example, the waveform parameters may include the fluctuations in amplitude and phase of each message element, the FWHM width of the fluctuation distribution and its peak offset. The modulation deviations, relative to the predetermined modulation levels, of each message element, may also be provided. Further waveform parameters such as the polarization, characteristics of the symbol edges, and a possible frequency offset of the observed frequency of the message element, may be provided.

At 1905, the receiver provides, as further input to the AI model, certain rules or legality data, such as the requirements and specifications for the current message type, its required form and format, and permissible ranges of syntax and parameter values.

At 1906, the receiver provides, as further input to the AI model, the content data of the message, such as the meaning or intent of the message. The content data may include data about the syntax and numerical parameters present in the message, or the application or context related to the message, or the expected intent of the message, for example.

At 1907, the receiver provides, as further input to the AI model, historical data such as a listing of previous messages to the current receiver, or to other receivers of the same message type. In addition, the historical data may include previous faults and fault mitigation attempts, by the current AI model or other models, and optionally the success or failure of such attempts. The AI model can learn from such prior attempts, and determine how to better recognize the faulted message elements, how to mitigate them, and how to avoid the pitfalls that have been seen before.

At 1908, the receiver provides, as further input to the AI model, external factors such as the current background level of electromagnetic radiation (as determined according to a proximate reference element with no local transmission therein), properties of the demodulation reference(s) which the receiver used to recalibrate the modulation levels that were then used to demodulate the message.

At 1909, the receiver activates the AI model, which processes the inputs and predicts the corrected value of the likely faulted message element. The AI model can also determine which message element is the most likely faulted, based on some or all of the same inputs. If multiple message elements are suspicious, the AI model may be able to evaluate the likelihood that each of them is faulted. The AI model may be able to determine, based on message content or historical data, what the most likely correct values are for each faulted message element. In cases where the AI model finds multiple possible corrections, the AI model may determine the likelihood of each of the possible corrected versions, and may select the most likely version. However, if two or more of the corrected versions are found with about the same high likelihood, the AI model may alert the receiver that the corrected version is ambiguous.

Figure 20:
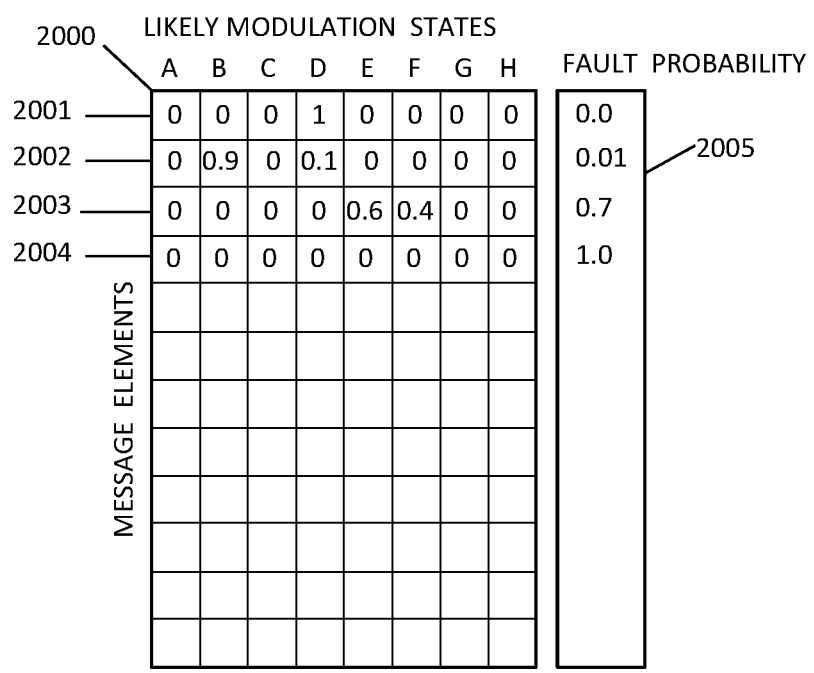
FIG. 20 is a chart showing an exemplary embodiment of probability values for each message element having each of the modulation states, according to some embodiments.

FIG. 20 is a chart showing an exemplary embodiment of probability values for each message element having each of the modulation states, according to some embodiments. As depicted in this non-limiting example, a receiver has measured the waveform parameters and other parameters associated with fault locations for each message element, and assigned probabilities as to the modulation state of the message element. The receiver has also determined an overall fault probability for each message element.

A table 2000 shows, for each message element in the message, the probability that the message element is modulated in each of eight modulation states (A, B, etc.) of a modulation scheme. The message has 12 message elements, but only four are shown here for simplicity. Also shown in a final column 2005 is an overall probability that each of the message elements is faulted.

The first message element 2001 has all zeroes except a single "1" for the modulation state "D". Hence the first message element 2001 is known with high confidence to be a "D" and its fault probability is zero in the fault column 2005.

The second message element 2002 has a 0.9 probability under state "B" and 0.1 probability under state "D". Therefore the message element is most probably a "B" but not with complete certainty. Accordingly, its fault probability is slightly raised to 0.01.

The third message element 2003 has 0.6 for state "E" and 0.4 for state "F". Consequently, it may be an "E" but could well be something else. Hence its fault probability is high, 0.7.

The fourth message element 2004 is all zeroes. This indicates that its modulation deviation was so large, or its amplitude fluctuations were so high, or another parameter was so extreme, that none of the modulation states was consistent with the signal of the message element. Therefore, it is certainly interfered, hence a 1.0 in the last column 2005.

Manner of Implementation

Fault detection, localization, and correction by waveform analysis, as disclosed herein, may be implemented in software or firmware, enabling base stations or user devices to repair corrupted messages without requesting a retransmission in many cases. The AI model outputs may also provide valuable data on fault types and fault rates on a per-user basis. The fault analysis may reveal certain modulation states that are frequently faulted. For example, certain pairs of states in 16QAM are only 37 degrees apart, whereas other pairs are 90 degrees apart in waveform phase. Hence the AI model may ascribe a higher probability of phase faulting between the closely-spaced states than the widely-spaced pairs.

Rapid fault localization and mitigation by the receiver, as disclosed herein, may enable increased overall reliability, and greatly reduced latency relative to retransmissions, while consuming far less resources and radiated power than forward-error-correcting codes and the like.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touch-screen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing medium. The outputs may be delivered to a user by way of signals transmitted to robot steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for a wireless receiver to correct a corrupted message, the method comprising:
    a) receiving a message and determining that the message includes at least one faulted message element, wherein each message element comprises a single resource element of a resource grid, each message element comprising a waveform signal, the waveform signal modulated according to a modulation scheme comprising Nstate allowed modulation states;
    b) determining at least two waveform parameters of each message element;
    c) determining, according to the at least two waveform parameters, a signal quality of each message element;
    d) selecting a selected message element having a lowest signal quality;
    e) replacing the selected message element with a different modulation state of the Nstate modulation states;
    f) determining whether the message, including the selected message element so replaced, is corrupted;
    wherein the modulation scheme comprises phase modulation according to Nstate equally-spaced predetermined phase levels;
    wherein the determining a signal quality of each message element comprises:
    a) determining a closest phase level, of the predetermined phase levels, to a phase of the waveform;
    b) determining a phase deviation comprising a magnitude of a difference between the phase of the waveform of the message element and the closest phase level; and
    c) further determining the signal quality of each message element according to the phase deviation of each message element.

2. The method of claim 1, wherein the message is received according to 5G or 6G technology.

3. The method of claim 1, further comprising determining that the message, including the selected message element so replaced, is corrupted when the message, including the selected message element so replaced, or a hash or digest thereof, disagrees with an error-detection code associated with the message.

4. The method of claim 1, further comprising determining that the message, including the selected message element so replaced, is corrupted when the message, including the selected message element so replaced, includes at least one out-of-range or illegal value.

5. The method of claim 1, further comprising determining that the message, including the selected message element so replaced, is corrupted when the message, including the selected message element so replaced, has an illegal form or format.

6. The method of claim 1, wherein the further determining the signal quality of each message element according to the phase deviation of each message element comprises:
    a) determining a width of a distribution of the phase deviations;
    b) for each message element, determining a ratio comprising the phase deviation of the message element divided by the width of the distribution of the phase deviations; and
    c) further determining, according to the ratio, the signal quality of each message element.

7. The method of claim 1, further comprising:
a) for each message element, measuring a plurality of phase values of the waveform of the message element, each phase value measured at a different time within the resource element of the message element;
a) for each message element, determining a width of a distribution of the measured phase values; and
b) further determining the signal quality of the message element according to the width of the distribution of the measured phase values.

8. The method of claim 1, further comprising:
a) for each message element, determining a plurality of amplitude values of the waveform of the message element, each amplitude value measured at a different time within the resource element the message element;
b) for each message element, determining a width of a distribution of the measured amplitude values; and
c) further determining the signal quality of the message element according to the width of the distribution of the measured amplitude values.

9. The method of claim 1, further comprising:
a) for each message element, combining the two or more parameters, or values derived therefrom, of the message element; and
b) determining, from a maximum or minimum of the combination, which message element is most likely to be faulted.

10. Non-transitory computer-readable media in a wireless receiver, the non-transitory computer-readable media containing instruction that, when executed by a computing environment, cause a method to be performed, the method comprising:
a) using a modulation scheme comprising amplitude modulation according to integer Namp predetermined amplitude levels and phase modulation according to integer Nphase predetermined phase levels;
b) receiving a message comprising message elements, each message element comprising a single resource element of a resource grid comprising symbol-times in time and subcarriers in frequency, each message element comprising a waveform signal;
c) determining that the message is corrupted;
d) for each message element, measuring a waveform amplitude and a waveform phase comprising the waveform signal;
e) for each message element, comparing the waveform amplitude to the Namp predetermined amplitude levels, and determining an amplitude deviation comprising a difference between the waveform amplitude and a closest predetermined amplitude level;
f) for each message element, comparing the waveform phase to the Nphase predetermined phase levels, and determining a phase deviation comprising a difference between the waveform phase and a closest predetermined phase level;
g) determining, according to the amplitude deviation and the phase deviation, a signal quality of each message element; and
h) determining a particular message element having a lowest signal quality, is faulted.

11. The non-transitory computer-readable media of claim 10, the method further comprising:
a) for each of the Namp predetermined amplitude levels, determining a subset of the message elements wherein the predetermined amplitude level is closest to the waveform amplitude, thereby determining Namp subsets;
b) for each subset, calculating an average amplitude of the waveform amplitudes of message elements in the subset, thereby determining Namp average amplitudes of the Namp subsets;
c) for each message element, determining an amplitude differential between the waveform amplitude of the message element and the average amplitude of the subset; and
d) further determining the signal quality of each message element according to the amplitude differential of the message element.

12. The non-transitory computer-readable media of claim 10, the method further comprising:
a) for each of the Nphase predetermined phase levels, determining a subset of the message elements wherein the predetermined phase level is closest to the waveform phase, thereby determining Nphase subsets;
b) for each subset, calculating an average phase of the waveform phases of message elements in the subset, thereby determining Nphase average phases of the Nphase subsets;
c) for each message element, determining a phase differential between the waveform phase of the message element and the average phase of the subset; and
d) further determining the signal quality of each message element according to the phase differential of the message element.

13. The non-transitory computer-readable media of claim 12, the method further comprising:
a) determining, according to the Nphase average phases, a phase rotation angle; and
b) subtracting the phase rotation angle from the waveform phase of each message element.

14. The non-transitory computer-readable media of claim 10, the method further comprising:
a) determining, for each message element, an amplitude transition quality factor according to an amplitude variation in a guard-space, wherein the guard-space comprises a time interval between the message element and a resource element immediately adjacent to the message element; and
b) further determining the signal quality of each message element according to the amplitude transition quality factor of the message element.

15. The non-transitory computer-readable media of claim 10, the method further comprising:
a) determining, for each message element, a phase transition quality factor according to a phase variation in a guard-space, wherein the guard-space comprises a time interval between the message element and a resource element immediately adjacent to the message element; and
b) further determining the signal quality of each message element according to the phase transition quality factor of the message element.

16. The non-transitory computer-readable media of claim 10, the method further comprising;
a) determining, for each message element, a polarization angle comprising an arctangent of a first polarization component of the waveform divided by a second polarization component of the waveform, the second polarization component being orthogonal to the first polarization component;
b) determining an average polarization angle of the message elements; and c) further determining the signal quality of each message element according to a difference between the polarization angle of the message element and the average polarization angle.

17. The non-transitory computer-readable media of claim 10, the method further comprising;
  a) determining, for each message element, a frequency offset comprising a frequency of the waveform of the message element minus a predetermined subcarrier frequency of the message element;
  b) determining an average frequency offset by averaging the frequency offsets of the message elements; and
  c) further determining the signal quality of each message element according to a difference between the waveform frequency of the message element and the average frequency offset.

18. A processor comprising an artificial intelligence model and non-transitory computer-readable media containing instructions that, when executed by a computing environment, cause the non-transitory computer-readable media of claim 10 to be performed, the method further comprising:
  a) providing, as input to the artificial intelligence model, a plurality of measured parameters associated with each message element of a message comprising message elements, wherein each message element comprises a waveform, and wherein the measured parameters comprise, for each message element, an amplitude of the waveform and a phase of the waveform;
  b) determining, as output from the artificial intelligence model, for each message element, a probability that the message element is faulted.

* * * * *